United States Patent [19]

Ingram

[11] 4,131,875
[45] Dec. 26, 1978

[54] METHOD AND APPARATUS FOR ACOUSTIC LOGGING OF A BOREHOLE

[75] Inventor: John D. Ingram, Meudon, France

[73] Assignee: Schlumberger Technology Corporation, New York, N.Y.

[21] Appl. No.: 631,348

[22] Filed: Nov. 12, 1975

[51] Int. Cl.$^2$ .............................................. G01V 1/40
[52] U.S. Cl. ...................... 340/15.5 BH; 340/15.5 A; 73/152
[58] Field of Search ............... 340/15.5 BH, 15.5 TN, 340/15.5 A, 15.5 AC; 181/102; 73/152

[56] References Cited

U.S. PATENT DOCUMENTS

| 3,127,950 | 4/1964 | Itria | 340/15.5 SW |
| 3,909,775 | 10/1973 | Lavigne | 340/15.5 BH |

FOREIGN PATENT DOCUMENTS

| 1176350 | 1/1970 | United Kingdom | 340/15.5 BH |

OTHER PUBLICATIONS

"Estimation of Formation Strength from the Mechanical Properties Log," Tixier et al., Society of Petroleum Engineers, Paper No. SPE4532, 1973.

*Primary Examiner*—Howard A. Birmiel
*Attorney, Agent, or Firm*—Louis H. Reens; Bruce N. Carpenter; William R. Sherman

[57] ABSTRACT

A method and apparatus are described for preferentially exciting and for extracting late arrivals at low frequencies in an acoustic investigation of a borehole. The late arrival may be the Stoneley wave whose amplitude is derived by measuring the energy in a predetermined frequency band of a waveform produced with a low frequency transmitter-receiver system. The transmitter produces a highly damped acoustic pulse whose frequency spectrum is selected to preferentially excite a late arrival such as the Stoneley wave and/or tube wave with wavelengths which are significantly greater than the diameter of the borehole while preserving measurable earlier arrivals at higher frequencies. A receiver system is used which provides a generally flat frequency response including low frequencies to produce waveforms of both the earlier arrivals at high frequencies and late arrivals at low frequencies with sufficient extractable amplitudes throughout a wide range of borehole and formation conditions. A method and apparatus are described for measuring inelastic behavior of the formation as well as elastic parameters such as the shear modulus of the material comprising the circumference of the borehole wall by investigating frequency bands in the spectrum of a late arrival such as the Stoneley wave. A display and method for generating the display are described for the investigations of the late arrival.

45 Claims, 21 Drawing Figures

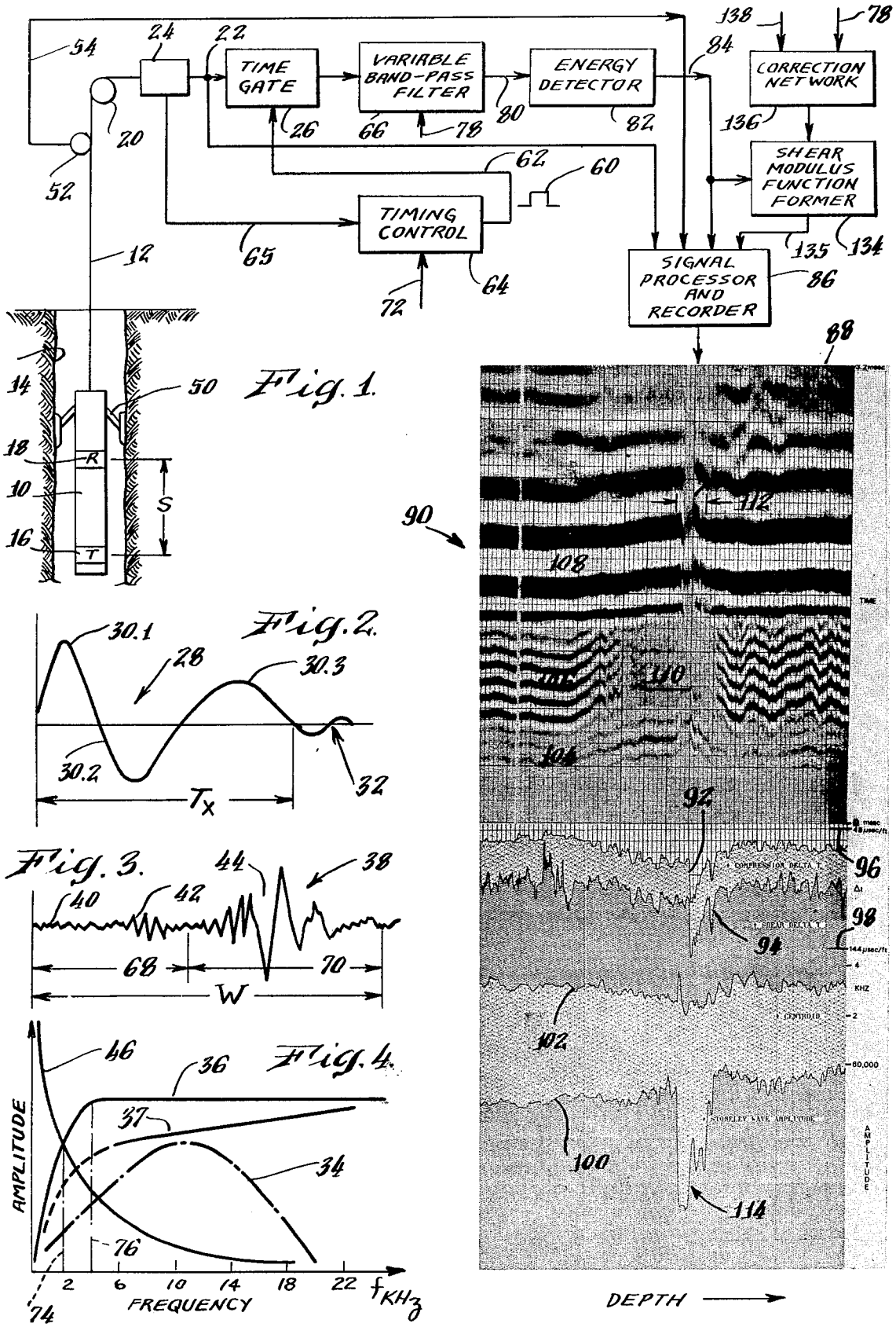

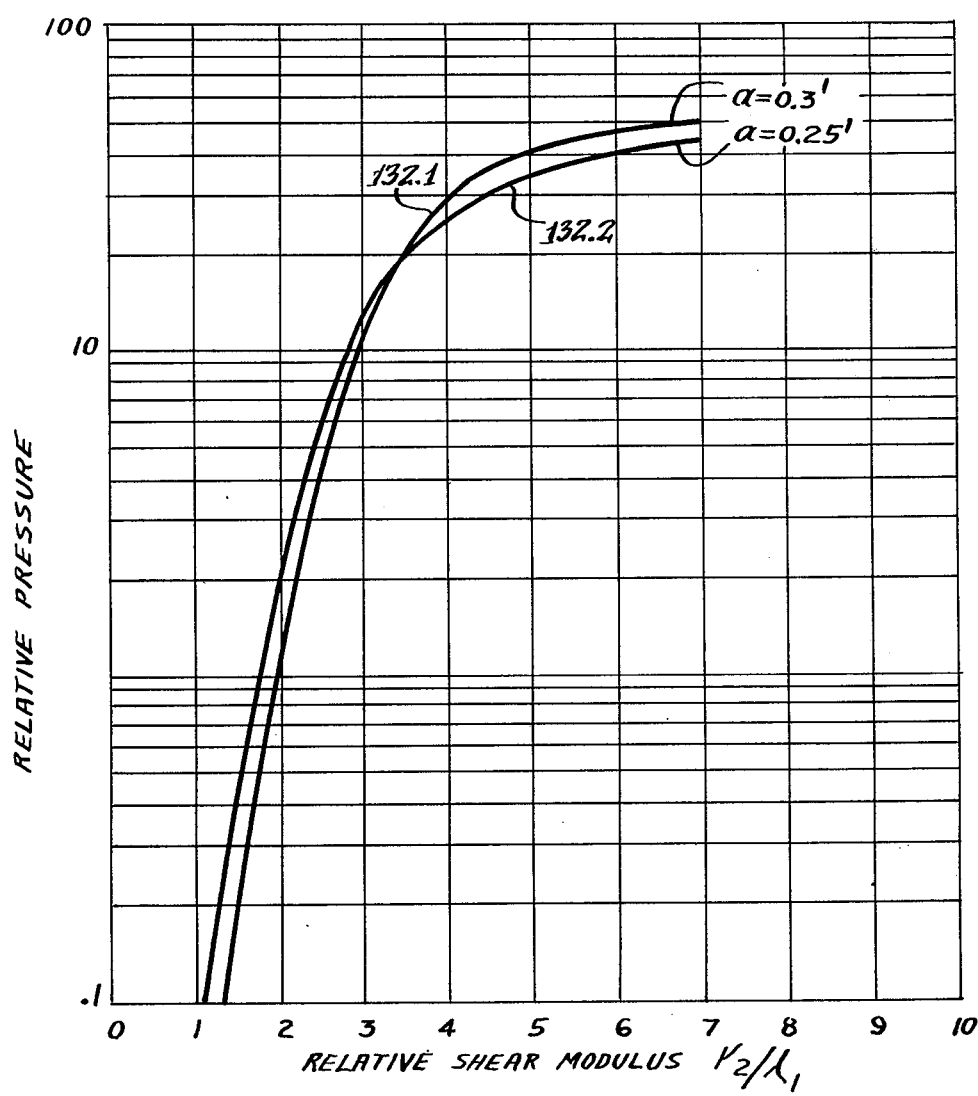

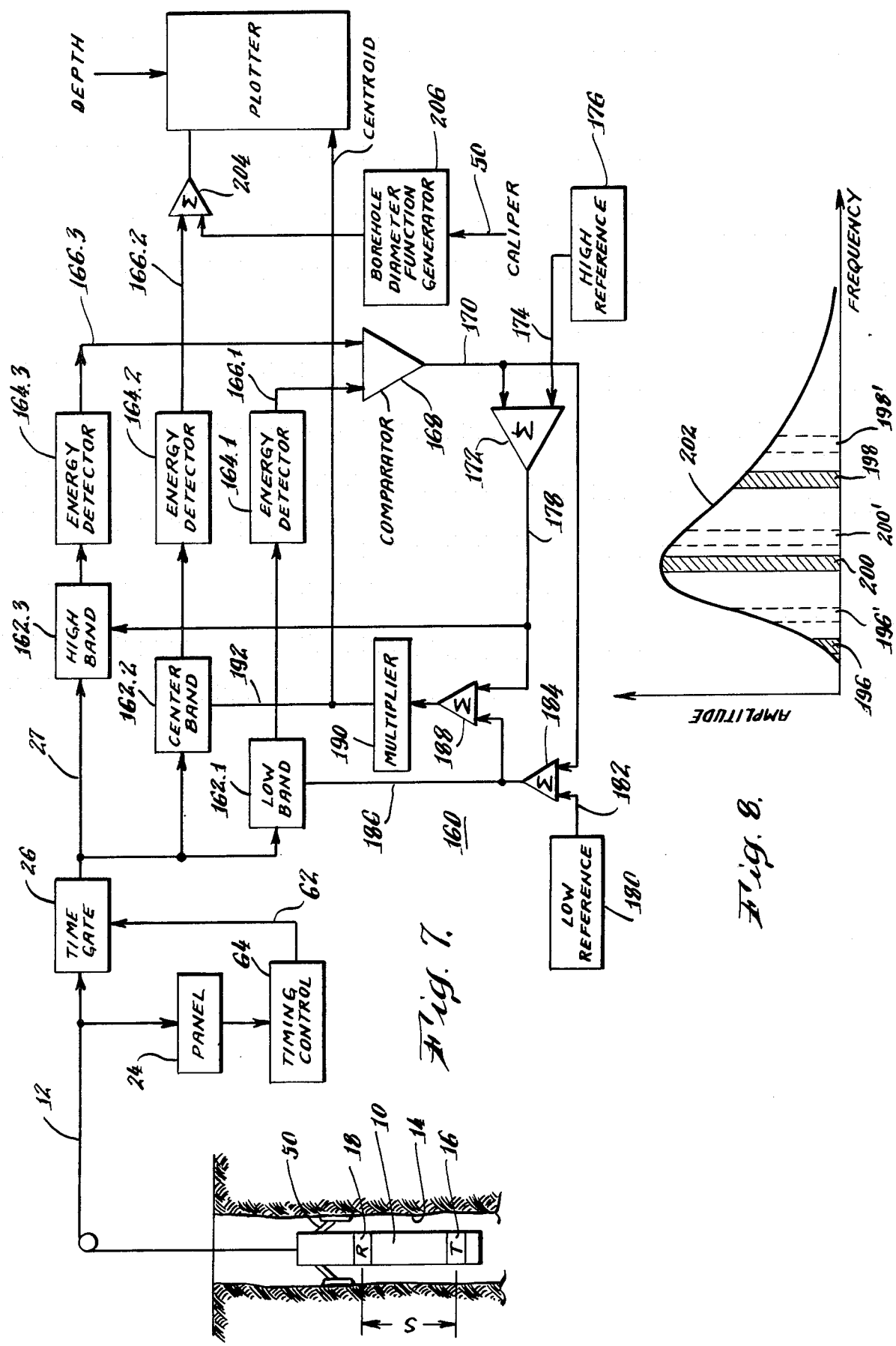

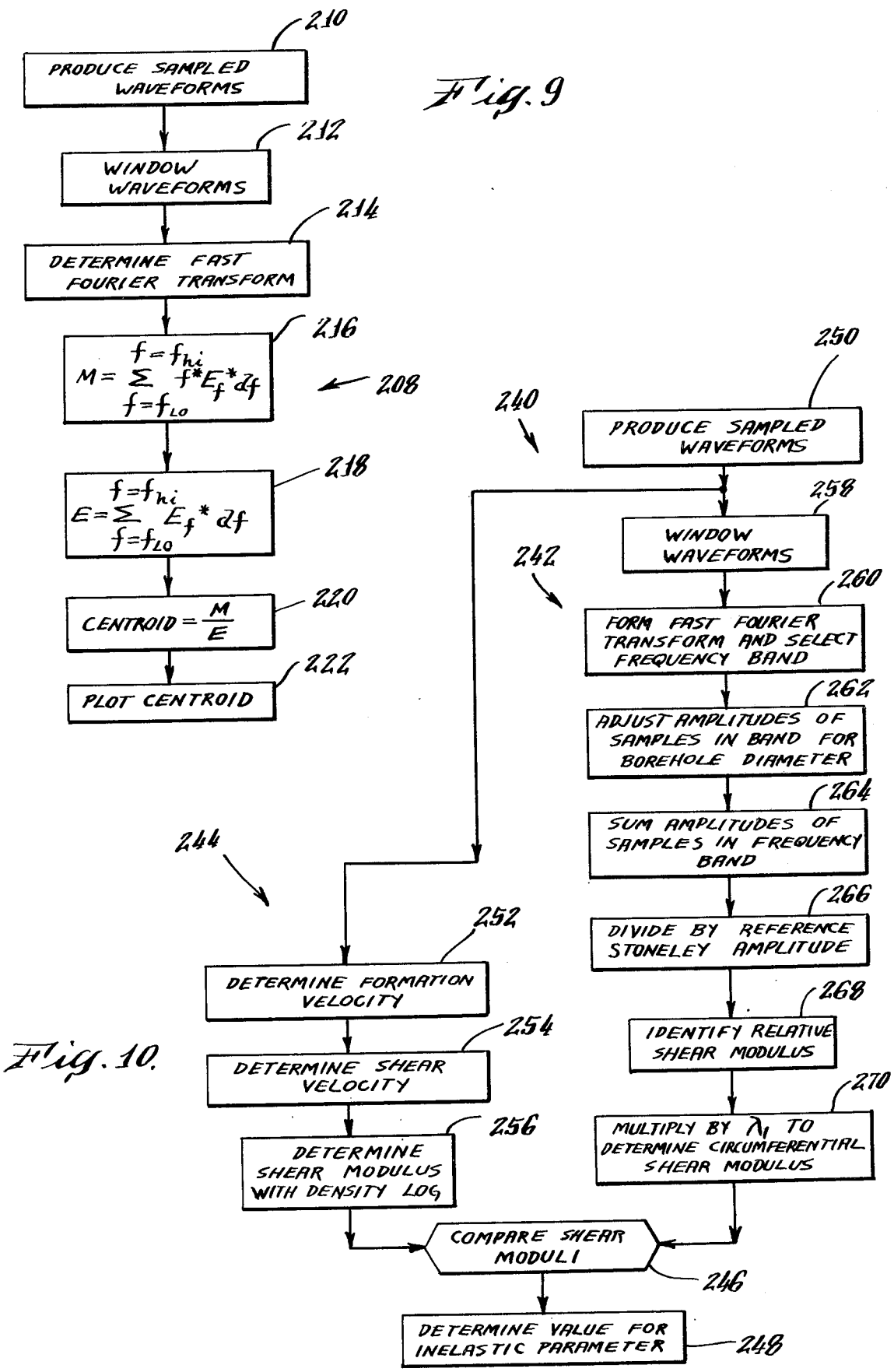

METHOD AND APPARATUS FOR ACOUSTIC LOGGING OF A BOREHOLE

FIELD OF THE INVENTION

This invention generally relates to acoustic borehole logging. More specifically, this invention relates to an apparatus and method for exciting and extracting late arrivals in waveforms obtained during an acoustic borehole investigation to enable the derivation of information about the borehole or the formation surrounding the borehole.

BACKGROUND OF THE INVENTION

In the field of acoustic well logging a tool is used wherein a sonic pulse transmitter and a sonic receiver are spaced axially along the borehole. Frequently, a plurality of sonic receivers are employed to improve the precision with which information can be obtained about the borehole and the earth formation around it.

When an acoustic pulse is generated by a transmitter, a complex acoustic wave train is produced. The acoustic waves travel both radially from the borehole into the formation and axially towards the sonic receiver or multiple receivers as the case may be. The sonic receivers include transducers whose outputs are electrical waveforms representative of the acoustic waves incident upon the receivers. Suitable amplifiers are employed to provide amplified waveforms for borehole investigation.

Reference is made to a 1963 publication in which the order of wave arrivals is described and separate waves identified. The article was presented at the Thirtieth Annual Fall Meeting of the Society of Petroleum Engineers of the American Institute of Mining, Metallurgical and Petroleum Engineers in New Orleans, Oct. 6-9, 1963 and is entitled "The Use of Compressional and Shear Acoustic Amplitudes for the Location of Fractures" by R. L. Morris, D. R. Grine and T. E. Arkfeld.

The acoustic waves incident upon the receivers usually arrive in the order of their respective velocities. Hence, for a transmitter-receiver spacing which is substantially greater than the borehole diameter, the wave arrivals in an open or uncased hole, are at first early arrivals such as the compressional wave, followed by a shear wave, a pseudo Raleigh wave and a direct-mud wave. These early arrival waves, in turn, are followed by so-called later arriving or low velocity waves such as the Stoneley and the tube waves. In a cased hole, the casing signal, or that portion of the acoustic energy traveling through the casing may be first to arrive. Depending upon the type of formation, the shear wave may arrive after the direct or mud arrival.

The term "late arrival" or "late arriving wave" as used herein refers to a sonic wave having a velocity which is less than the direct or mud wave. It has been discovered that such late arriving wave is further characterized by its energy-frequency excitation and that its excitation in a borehole may be enhanced at low frequencies or at a sonic wavelength $\lambda$ which is of the order of or significantly larger than the borehole diameter d, or $\lambda >> d$.

A late arrival such as the Stoneley wave would be characterized in a perfectly elastic medium with a uniform energy distribution across the borehole and a theoretical amplitude response which varies exponentially and inversely with frequency from a minimum at high frequencies to a maximum at low frequencies. In such perfect medium there should be no attenuation of any frequency with distance for the Stoneley wave. At some frequencies the Stoneley wave is dispersive in nature and its phase velocity varies with frequency.

The entire acoustic waveform from a short spacing receiver has a complex appearance by virtue of various factors such as inadequate time to obtain wave separations because of the limited spacing between the receiver and transmitter, the different decay times for the different arrivals, the presence of reflections in the borehole, the duration and spectrum of the sonic pulse generated by the transmitter and the detection and transfer function of the sonic receiver system. Added to these factors are the variations imposed by the media one seeks to investigate such as the formation and the borehole.

One may, for example, in conjunction with other logging information, construct an elastic model of the formation being investigated. Variations between the elastic model parameters and those measured from an acoustic borehole investigation of the later arrivals as disclosed herein may then be used to derive significant characteristics such as the degree of compaction, fracturing and vugular formation. Both early and late arrivals may contribute useful information; hence, the entire acoustic waveform produced by a sonic receiver in response to a sonic transmitter pulse can be of interest.

The earliest arriving waves in the acoustic waveform have been extensively used to derive information about the borehole medium, whether this be the formation around the borehole or the quality of the cement bonding in a cased borehole. In cement bonding evaluation, variations in amplitude of an early wave arrival such as the casing signal is monitored. The transit time or velocity of waves such as the formation compressional wave and shear wave are frequently measured by detecting these waves in the waveforms of sequentially spaced sonic receivers. In a copending patent application entitled "Method and Apparatus for Determining Acoustic Wave Parameters for Well Logging" filed on May 27, 1975 by the same inventor as for this invention and assigned to the same assignee, an accurate and reliable technique for determining the transit times is described, for example, for the compressional and shear waves.

It is frequently desired to determine the shear modulus, $\mu_2$, of the formation. This elastic parameter may be directly determined from a knowledge of the velocity of the shear wave, $V_s$, by the relationship $\mu_2 = \rho V_s^2$ where $\rho$ is the density of the formation and may be derived from a density log. The velocity of the shear wave, however, is not always convenient to measure, particularly when the shear wave velocity is about equal or less than the fluid or direct mud wave velocity. The shear wave frequently is obscured by other arrivals and of smaller magnitude than the earlier arriviing compressional wave. Accordingly, a direct measurement of the shear wave is not always practical and other approaches for the determination of the shear modulus of the formation are needed.

The prior art includes numerous publications which make reference to later arrival waves in an acoustic waveform. In an early publication by M. A. Biot, entitled "Propagation of Elastic Waves in a Cylindrical Bore Containing a Fluid," published in the Journal of Applied Physics, Vol. 23, No. 9, September 1952, pages 997-1005, the behavior of a later arrival wave such as the Stoneley wave is described.

Other publications dealing with late arriving waves have been made, such as in U.S. Pat. No. 3,127,950 by O. A. Itria for a method of determining shear wave velocities by employing a large transmitter-receiver spacing to obtain measurements of the velocity of a tube wave and the densities of the borehole fluid and the formation surrounding the borehole. Time separation and attenuation inherent to considerable transmitter-receiver spacing are employed by Itria together with a gating circuit to reject unwanted earlier wave arrivals.

Acoustic transmitters for producing sonic pulses containing low frequencies have been described in the art for investigating early arrivals particularly in cased holes (see U.S. Pat. No. 3,909,775 to J. C. Lavigne). Note, for example, an April 1966 article by Chaney et al published in the Journal of Petroleum Technology on page 407 and entitled "Some Effects of Frequency Upon the Character of Acoustic Logs." As described in this latter article, compressional amplitude studies are improved by the elimination of frequencies between 20 KHz and 50 KHz from the effective pulse spectrum. In British Patent No. 1,176,350 sonic pulses with spectra of from 2 KHz to about 20 KHz are described as useful to derive information related to the permeability of earth formation. A low frequency transducer for generating acoustic energy above 75db level for a bandwidth from 2.4 KHz to 9.6 KHz is described in U.S. Patent to Holloway, U.S. Pat. No. 3,845,333.

The use of late arrival waves such as the Stoneley wave in borehole investigations requires a convenient practical method for exciting and extracting such wave. In order to enhance the generation of Stoneley waves, it is desirable to emphasize those parameters of a well logging tool needed to excite and enable extraction of the Stoneley wave over a broad range of lithology conditions.

Frequency analyses have been proposed for waveforms representative of sonic waves to identify the amplitudes of different frequencies. See, for example, the U.S. Patent to Moore, U.S. Pat. No. 3,588,800 wherein a borehole investigation technique is described using a spectrum analyzer responsive to waveforms. The measured amplitude of different frequency segments are used to drive information about the earth formation. A frequency spectrum analysis beginning at about 30 KHz and extending to about 200 KHz is taught to be useful for the earth formation analysis.

In the U.S. Patent to Beil, U.S. Pat. No. 3,747,702, a sonic waveform spectrum analysis technique is described for evaluating the quality or effectiveness of the cement in a cased borehole. Early arriving waves in acoustic waveforms may be examined with three adjustable passband filters to determine the cement condition. The center bands of the filters are selected on the basis of the size of the casing. The frequency range is selected sufficiently wide from about 10 KHz to about 35 KHz range to enable the examination of early arrivals such as the compressional and determined sonic wave reflection coefficients.

A difficulty in extracting a late arrival may be caused by relatively long lasting transmitter sonic pulses. These long pulses tend to produce wave interferences at the receiver between persisting early arrivals and beginning late arrivals at least with commonly employed transmitter-receiver spacings. Improved wave separation, and thus less wave interference can be obtained by increasing the transmitter-receiver spacing but at the expense of a loss in amplitude of the early arrivals. Since it is preferred to preserve the early arrivals as well as the late arrivals, special techniques are needed to generate, extract and employ both the early and late arrivals in the entire wavetrain.

SUMMARY OF THE INVENTION

In one technique for acoustic investigation of a borehole in accordance with the invention, late wave arrivals can be preferentially enhanced relative to early arrivals and subsequently extracted throughout a wide range of borehole conditions. A low frequency transmitter pulse is employed to excite correspondingly late arrivals at advantageous low frequencies. These are extracted utilizing a broad band receiver system whose bandwidth extends sufficiently low to include the enhanced later arrivals.

The extracted late arrival may be subjected to an analysis of its energy distribution to derive and display a parameter of value in the borehole investigation. For example, as described in accordance with one technique for practicing the invention, the amplitude of a late arrival such as the Stoneley wave is measured in a particular frequency band and used to derive an indication of the hoop stiffness or the circumferential shear modulus of the wall of the borehole. In still another technique the amplitude frequency behavior of a late arrival such as the Stoneley wave may be used to derive a parameter of the borehole medium which includes the borehole itself or the formation surrounding the borehole.

The extracted late arrival may be used to obtain a measurement of an inelastic parameter or deviations from an elastic model of the formation. For example, in accordance with one technique, a parameter such as the circumferential shear modulus is measured with the Stoneley late arrival. Deviations in the value of the circumferential shear modulus of the borehole relative to the shear modulus of the formation may then be a measure of inelastic behavior. Such deviation may arise because of the property of the borehole wall such as fractures or from the fact that parts of the formation are allowed to slip with respect to each other or from lack of compaction.

As described in still other techniques, the frequency characteristics of a late arrival are measured and variations are identified as a particular inelastic behavior. In some cases unusual variations in the amplitude of a late arrival such as the Stoneley wave may be significant of particular types of fractures in the wall of the borehole. Such inelastic parameters are of importance in well logging as can be appreciated with reference to an article entitled "Estimation of Formation Strength From the Mechanical Properties Log" by M. P. Tixier, G. W. Loveless and R. A. Anderson, presented as Paper Number SPE4532 at the Forty-eighth Annual Fall Meeting of the Society of Petroleum Engineers, held in Las Vegas, Nevada, Sept. 30–Oct. 3, 1973.

As described with reference to one technique for exciting the Stoneley wave, a transmitter acoustic pulse source is used whose spectrum is rich in low frequency components to enhance the low frequency end of the spectrum of late arriving waves.

The transmitter pulse duration is kept short to achieve sufficient wave separations at the receiver with a transmitter-receiver spacing which enables extraction of both early and late wave arrivals.

The technique further involves a sonic receiver system whose bandwidth is sufficiently broad to extend in to the spectrum of late arriving waves. This assures measurable signal levels for their extraction throughout a wide range of formation lithologies. With the preferential low frequency Stoneley wave excitation and low extending bandwidth receiver system an enchancement of the later arrival signal is obtained. The enhanced signal may then be employed to derive useful information about the borehole or with lithologies which, contrary to elastic model expectations, significantly attenuate the acoustic waves.

In one technique for the extraction of a late arrival in accordance with the invention, a characteristic segment of the waveform produced by a sonic reciever is selected to isolate late arrivals and enable their extraction substantially without interference from earlier acoustic wave arrivals. The selected segment is passed through a narrow band filter whose passband is preferentially located in the spectrum of the late arriving wave to obtain a determination of its energy and exclude frequency components of higher frequencies characteristic of earlier arrivals.

In the case of an extracted Stoneley wave, its measured energy in the passband may be used in accordance with one technique, to derive an indication of the circumferential shear modulus of the formation. A function signal is employed whose shape corresponds to the variation of the amplitude of the Stoneley wave as a function of the shear modulus. The measured amplitude of the Stoneley wave and the function signal may then be used to derive a measurement of the circumferential shear modulus.

As further described with reference to one embodimnet for practicing the method and apparatus of the invention, a plurality of acoustic waveforms are produced which include both early and late acoustic wave arrivals. These waveforms may be in a sampled form to enable a high seed processor to extract late arrival waves with a signal enhancement technique such as velocity filtering or stacking. The processor further may be used to determine, for example, the transit times of earlier arriving acoustic waves such as the compressional and shear wave as well as the amplitude of the later arriving Stoneley wave. Composite displays of characteristics of early and late arrivals may then be formed.

With a low frequency excitation source, a correspondingly low frequency Stoneley wave may be excited. Such low frequency late arrival is advantageously less sensitive to local geometric variations while the cylindrical shape of the borehole enhances the amplitude of the Stoneley wave. Under elastic model conditions the low frequency Stoneley signal energy is conserved and propagates without attenuation to thus provide good signal levels with which to conduct measurements.

A further advantage in using a low frequency late arrival resides in that reflected modes arising when the formation shear velocity is below the mud velocity are of higher frequency. The reflected modes have cut-off frequencies below which the reflected modes are attenuated. The use of low frequency late arrival below these cut-off frequencies thus improves avoidance of interference from reflected modes.

It is, therefore, an object of the invention to provide a method and apparatus for preferentially exciting and extracting low frequency late arrivals in waveforms produced with an acoustic investigation of a borehole.

It is a further object of the invention to provide a method and apparatus for extracting late arrivals to determine characteristics of the formation in an acoustic investigation of a borehole.

It is still further an object of the invention to provide a method and apparatus for extracting and measuring characteristics of late acoustic wave arrivals in an acoustic investigation of a borehole.

It is still futher an object of the invention to display characteristics of preferentially excited late arriving waves and utilize these characteristics to derive elastic and inelastic parameters of the borehole or the formation surrounding the borehole.

These and other objects and advantages of the invention can be understood from the following description of several techniques for practicing the invention and described in conjunction with the following drawings.

BRIEF DESCRIPTION OF DRAWINGS

FIG. 1 is a schematic block diagram of one acoustic investigation apparatus for exciting, extracting and displaying a late arrival wave in accordance with the invention;

FIG. 2 is an illustrative waveform representation of a time history of the amplitude of an acoustic pulse produced by a transmitter employed in the sonic borehole investigating apparatus shown in FIG. 1;

FIG. 3 is an exemplary time amplitude plot of a receiver waveform obtained in response to an acoustic pulse from a transmitter;

FIG. 4 is a plot illustrative of various curves of amplitude as a function of frequency for various acoustic waves and a receiver frequency response characteristic;

FIG. 6 is a plot representative of the variation of the relative amplitude of the Stoneley wave as a function of relative shear modulus for different borehole diameters.

FIG. 7 is a schematic block diagram illustrative of an apparatus for determining the amplitude of a late arriving wave such as the Stoneley wave as well as an approximate centroid frequency determination thereof;

FIG. 8 is an amplitude frequency plot for illustrating the operation of the apparatus of FIG. 7;

FIG. 9 is a flow chart of steps for an exemplary method to determine the centroid frequency of a late arriving wave;

FIG. 10 is a flow chart of steps illustrative of a method for deriving inelastic parameters;

FIGS. 1, 2, 3, 4, 5 and 6

With reference to FIG. 1, a sonic borehole logging tool 10 is shown suspended from a cable 12 in a borehole 14. The tool 10 includes a transmitter 16 located at the bottom of the tool and a receiver 18. The cable 12 is fed over a pulley 20 to a panel 24 from which the input of receiver system, after suitable amplification, is applied on line 22 to a time gate 26. The reference herein to a receiver system is intended to include a single or a multiple or sonic receivers 18 as well as the associated electronic signal processing devices such as amplifiers, filters, equalizers and the transmission path formed by the cable 12.

Figure 5:
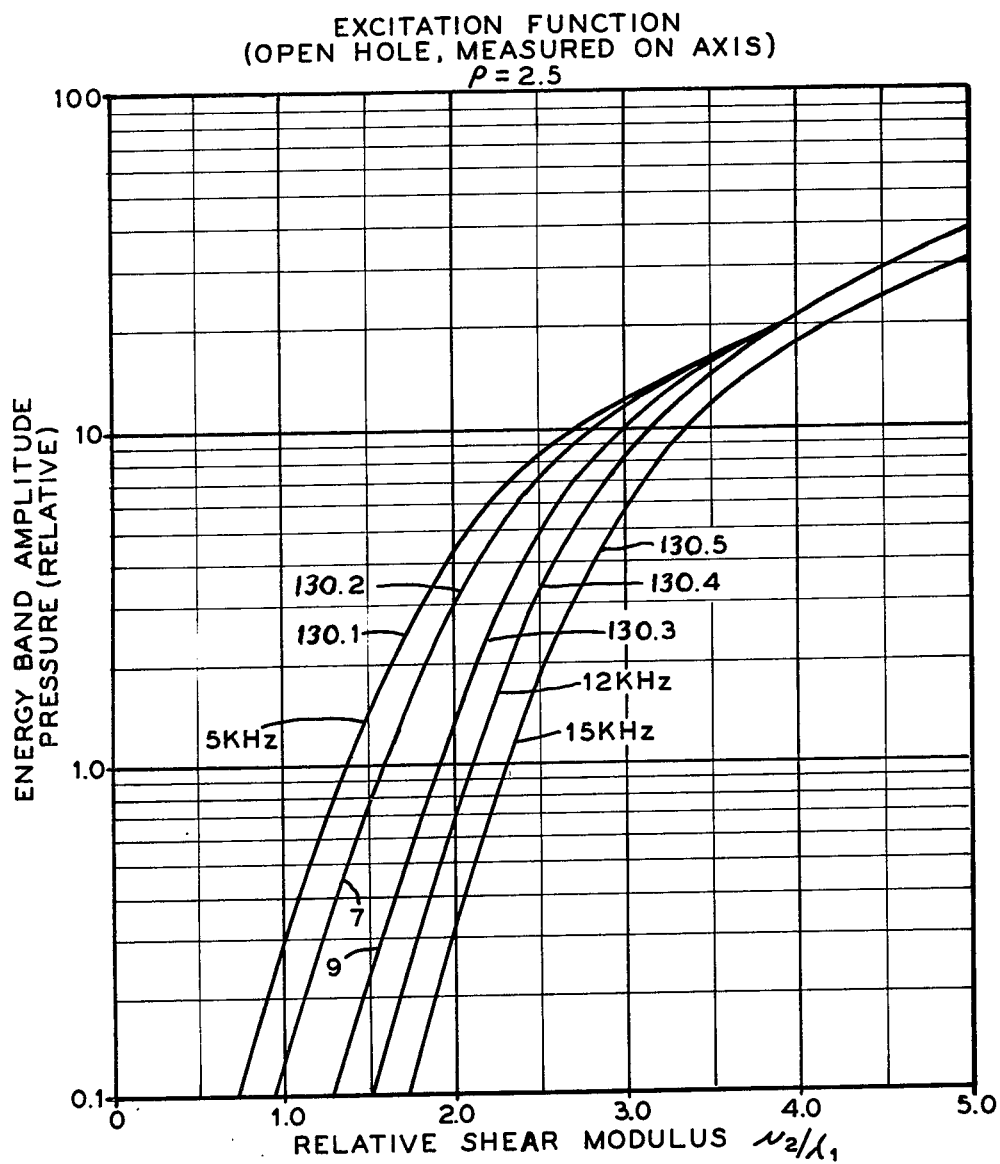
FIG. 5 is a plot representative of the variations of the relative amplitude of the Stoneley wave as a function of relative shear modulus for different Stoneley wave frequencies.

The transmitter 16 is selected to produce a sonic pulse, such as 28 shown in FIG. 2. Pulse 28 is rich in low frequencies and has a spectrum selected to preferentially excite low frequency late arriving waves. The shape of the transmitter pulse 28 is highly damped to keep it of short duration, in the range of about 150 microseconds as measured for the duration of the first three half cycles 30.1-30.3, each of which has the appearance of a half sinewave but of a different duration. The balance of the transmitter pulse rapidly decays with a ripple 32 of low amplitude and at a frequency of about 10 KHz. A highly damped non-ringing transmitter pulse can be produced with a transmitter such as described in the U.S. Pat. No. 3,496,533 which is issued to Semmelink.

The spectrum of the transmitter 16 is selected to provide an excitation function whose frequencies extend preferably down to very low frequencies where the late arrival waves can be preferentially stimulated and subsequently extracted with a minimum of interference from equipment bandwidth limitations. A transmitter spectrum whose frequencies extend with significant amplitudes down to about 500 Hz would be particularly desirable. However, a transmitter spectrum having a shape as suggested by curve 34 in FIG. 4 has been found useful in stimulating and extracting late arrival waves. For the latter curve 34 the transmitter pulse shows a maximum amplitude at about 11 KHz and with a 3 db bandwidth extending from about 7 KHz to about 15 KHz. At the low frequency end, the transmitter pulse 28 is about 10 db down from its maximum amplitude at about 2 KHz and has negligible energy above about 20 KHz.

The receiver system includes a sonic transducer, an amplifier and suitable impedance matching circuits, not shown, with wide bandwidth capable of detecting low frequency late arriving waves. The overall bandwidth of the receiver system is selected so that it has an essentially flat frequency response down to low frequencies such as of the order of several hundred Hertz with a minimum of interference from equipment limitations arising in the detection and extraction of low frequency late arrivals. Such wide frequency spectrum for the receiver system may be achieved by employing an analog to digital converter down hole in the tool 10 near receiver 18. In such case digitized waveforms are transmitted along cable 12 while degenerating influences on the frequency spectrum of the sonic waveforms from cable 12 and associated electronic signal amplifiers and equalizers are avoided.

Although the frequency response 36 as shown in FIG. 4 of the receiver system, from transducer to the output 22 from panel 24, preferably extends to a very low frequency, a response 36, which is flat to about 4 KHz and is 3 db down at about 3 KHz, has been found useful to extract late arrivals. The receiver system response may be made flat by selecting and sizing components and mounting features which locate the natural resonance of the transducer in the receiver 18 substantially above frequencies of interest, for example at frequencies of the order of about 50 KHz. Hence, for purposes of obtaining an extraction of the enhanced low frequency late arrival, the transducer in the receiver 18 is used far below resonance.

The waveform 38 shown in FIG. 3 is exemplary of a full waveform obtained with a long transmitter to receiver spacing, S, of about eleven feet in a borehole of about 8 inch diameter. The waveform shows a clear separation of several distinct waves such as the early arriving waves, the compressional wave 40, shear wave 42 and the late arrival such as the Stoneley wave 44. The waveform 38 is merely exemplary and it should be understood that the relative amplitudes of the early arrivals may be quite different and more obscured by such other waves as the direct mud arrival and the pseudo Rayleigh wave. In fact, the compressional wave 40 frequently is larger than the shear wave 42, particularly in soft formations. Generally, however, the shape and spectrum of the transmitter pulse 28 together with a wide bandwidth receiver system cooperate to excite and enable extraction of a significant late wave arrival such as the Stoneley wave 44.

The significance of the excitation and extraction of the low frequency late arrivals can be appreciated with reference to curve 46 in FIG. 4. This curve illustrates the theoretical amplitude versus frequency behavior of the Stoneley wave and shows relatively low amplitudes at intermediate frequencies of the order of 10 KHz but higher amplitudes at low frequencies where the wavelength of the wave is substantially greater than the diameter of the borehole. The extension of the bandwidth curve 36 of the receiver into the low frequency range and the preferential excitation of low frequencies with a transmitter pulse 28 achieves a greater amplitude for the low frequency late arrivals for extraction and utilization. In addition, curve 37 is illustrative of the excitation curve of an early arrival such as the compressional with frequency. The reduction in amplitude at low frequency is primarily a result of less coupling efficiency. This provides preferentially enhanced coupling to the formation at higher frequencies than for lower frequencies of the early arrivals.

The tool 10 is further shown provided with a caliper 50 to provide a measurement of the diameter of the borehole 14. A depth measuring device 52 is provided in operative contact with cable 12 to generate a depth signal on line 54 as the tool 10 is moved along the borehole 10 for an acoustic investigation.

The waveforms, such as 38 in FIG. 3, may be processed directly or stored in analog or sampled format on a suitable record such as a magnetic recorder for later extraction of late wave arrivals. Hence, as used herein, the term "producing waveforms" or its equivalents include the real time generation of waveforms such as with a tool 10 or the playback of these waveforms after they have been recorded on a medium such as an analog or digital tape recorder.

In the embodiment of FIG. 1, the waveforms from receiver 18 are processed by closing time gate 26 with an enabling window pulse 60 on line 62 from a control circuit 64. The panel 24 applies, on line 65, a signal representative of the firing time of transmitter 16 for control circuit 64. The window pulse 60 permits the waveform segment occurring during the time of the pulse 60 to pass through gate 26 to a variable band pass filter 66.

Circuit 64 also generates a delay of a duration as identified at 68 in FIG. 3 at the end of which the gate 26 allows the remaining receiver waveform portion 70 to reach the variable bandpass filter 66. The selection of the delay 68 can be estimated on the basis of the type of formation expected at the particular depth and can be varied accordingly to effectively remove the early arriving acoustic waves such as 40 and 42. The adjustment of the delay 68 may be obtained by using a conventional variable delay circuit which is controlled as suggested by a signal on line 72 in FIG. 1. Generally the delay 68 is made slightly longer than the transit time for the direct or mud wave. Its transit time per unit distance is known and the Stoneley wave or other late arrivals are known to arrive after the direct or mud wave. The duration of the window pulse 60 is selected commensurate with the remaining duration 70 of waveform 38 as shown in FIG. 3.

The variable bandpass filter has a bandwidth which may be about twenty-five percent of the center frequency. Hence, for a center frequency of about 3 KHz, the bandwidth is from about 2 KHz (line 74 in FIG. 4), to about 4 KHz (line 76 in FIG. 4). The center frequency and thus the entire passband may be varied in frequency as suggested with control line 78 in FIG. 1. A factor, which may influence the selection of the center frequency, can be the diameter of the borehole as measured by the caliper 50. In the event digital samples are being processed, the filter 66 may be digital recursive low pass filter to which the samples are applied.

The output 80 of the bandpass filter 66 is applied to a detector 82 which provides on its output line 84 an energy signal representative of the amplitude of the late arriving wave in the passband of filter 66. Detector 82 may be an energy detector or a root mean square, RMS, value measuring device to provide an output signal representative of the energy in the passband of filter 66. The energy signal may be directly recorded on a plotter driven by a depth signal on line 54. As shown in FIG. 1, the energy signal is applied to a signal processor and recorder 86 together with the depth signal on line 54 and waveform on line 22 to form a log 88.

Figure 15:
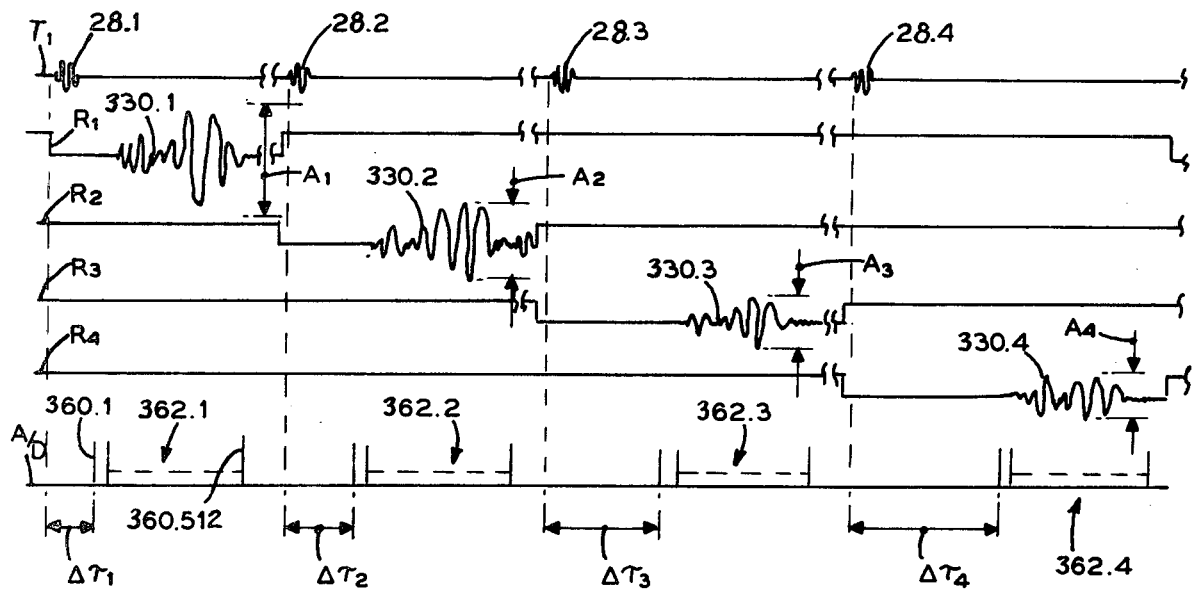
FIG. 15 is a timing diagram of waveforms generated with the apparatus of FIG. 14.

The log 88, as shown in FIG. 1, is for an open or uncased borehole and may be a composite plot as a function of well depth of several characteristics of waveforms such as 38. For example, a variable density log (VDL) 90 of waveforms 38 can be made whereby the light bands represent a large negative signal excursions and the dark bands represent large positive signal excursions, with intermediate gray scales representative of correspondingly smaller amplitude excursions. FIG. 15, as will be further described, shows an apparatus for producing a VDL. Although the variable density log 90 is a valuable visual aid in borehole investigation, the addition of logs of absolute values of parameters of specific waves in the waveforms enhances the utility of the visual log 88.

Accordingly, the signal processor recorder 86 provides logs 92, 94 of the interval transit times, $\Delta TC$ and $\Delta TS$ of particular early wave arrivals such as the compressional and shear waves respectively. Techniques for deriving these parameters can be as described in the aforementioned copending application when a plurality of receivers 18 are employed.

The total time scale employed for the VDL 90 is 3.2 milliseconds. The time scale for the transit travel time logs 92, 94 starts at 48 microseconds per foot at 96 and increases at a linear rate to 144 microseconds per foot at 98. One may appreciate that greater ranges may be accommodated when needed and that a different time scale may be used for VDL 90.

The log 88 includes a log 100 of the amplitude of a late arriving wave. The log 100 is derived from the energy signal on line 84 from detector 82 and represents the Stoneley wave energy at the output of filter 66. A log 102 of the centroid of the energy signal is provided alongside the amplitude log 100 to illustrate a value of the dominant frequency of the Stoneley wave or stated in a different manner, the frequency which is central to the dominant portion of the energy in the passband.

The log 88 may be made, solely with the extracted late arrival, i.e. with, for example, the amplitude log 100. However, the log 88 is particularly useful in connection with the display of other logs such as the VDL 90. The compressional arrival can be seen as relatively weak at 104 while a relatively stronger shear arrival occurs for the same depth at 106 and a correspondingly strong Stoneley arrival at 108.

A formation discontinuity is observed at 110 resulting in a weakened shear arrival and a reduction of the Stoneley wave at 112 and is confirmed by a drop in the amplitude of the Stoneley wave at 114. The depth interval over which the shear arrival is weakened suggests that a substantially thicker altered zone in the formation exists. However, the Stoneley wave plot 100 at 114 confirms a much narrower altered formation zone. The wavelength of the Stoneley wave, of the order of about 2.5 feet, enables a deeper investigation of the formation. Such information is of significant value in a borehole investigation.

The preferential excitation and extraction of the energy amplitude of a later arrival wave such as the Stoneley wave is useful for providing a characteristic of the formation such as the circumferential shear modulus. This is achieved with a set of compensation function curves shown at 130 in FIG. 5 and at 132 in FIG. 6. These curves can be approximated by a function former network 134, shown in FIG. 1, with conventional diode-resistor signal shaping networks or by storing the values of the calibration curves in the memory of a suitable signal processor. The output 135 of network 134 provides a correction signal on line 84 as an indication of the relative circumferential shear modulus of the formation.

Curves 130 in FIG. 5 represent the logarithmic variation of the relative amplitude or energy of the Stoneley wave as a function of relative circumferential shear modulus with different curves 130.1–130.5 relating to different frequencies. It should be understood that comparable curves 130 may be produced for lower frequencies. The upper limit of curves 132 are shown to terminate at a value of relative shear modulus of 5, though one may appreciate that the curves 130 can be extended to higher values. The curves 132 of FIG. 6, for example, are extended to include values of the relative shear modulus up to 7. Curves 132 in FIG. 6 are similar to curves 130 but for different borehole diameters such as 7.2 inches for curve 132.1 (radius of a = 3.6 inches) and 6 inches for a curve 132.2 (radius of a = 3 inches).

The relative shear modulus is a ratio of the shear modulus of the formation, $\mu_2$, to the compressional modulus of the fluid $\lambda_1$ which is a known quantity. Low values for the relative shear modulus generally below about three are representative of soft formations while values above about five are indicative of hard formations. The curves 130 and 132 illustrate a dramatic variation of the amplitude of the Stoneley wave in soft formations, while in hard formations, see FIG. 6, a relatively small amount of change in the Stoneley amplitude for corresponding changes in the value of the relative shear modulus occur.

In a case where the transit time for the compressional wave identifies a hard formation, a sudden measured drop in the Stoneley amplitude is in conflict with the predicted behavior in accordance with curve 132 in FIG. 6. One may, in such case, attribute the drop of the Stoneley amplitude as a measurement of vertical fractures in the formation; i.e., a failure of the formation to behave elastically.

The relative amplitude of curves 130 and 132 may be calibrated as the ratio of the amplitude of any given formation to a standard amplitude. The standard amplitude in the case of curves 130, 132 is for a limestone section for which a relative shear modulus is obtained on the basis of the classical relationships $$\left(\frac{\alpha_2}{\beta_2}\right)^2 = R^2 = 2\frac{(1-\sigma_2)}{1-2\sigma_2} \quad (1)$$

where
$\alpha_2$ = compressional velocity in the solid
$\beta_2$ = shear velocity in the solid
$\sigma_2$ = Poisson's ratio
R = simplified expression for the expression of the ratio $\alpha_2/\beta_2$ in terms of the Poisson's ratio $\sigma_2$ and it is not necessary to have a measure of the shear velocity $\beta_2$ to obtain R.

$$\frac{\beta_2}{\alpha_1} = \sqrt{\frac{\rho_1}{\rho_2}}\sqrt{\frac{\mu_2}{\lambda_1}} \quad (2)$$

where
$\alpha_1$ = compressional velocity in fluid
$\rho_1$ = density of fluid
$\rho_2$ = density of solid
$\mu_2$ = shear modulus of solid
$\lambda_1$ = compressional modulus of fluid By substitution of (1) into (2) the following relationship is obtained for the relative shear modulus $$\frac{\mu_2}{\lambda_1} = \frac{\rho_2}{\rho_1}\left[\frac{\alpha_2}{\alpha_1}\right]^2 \frac{1}{R^2} \quad (3)$$

The amplitude calibration in a standard limestone formation can be obtained by first determining its relative shear modulus based on a measured compressional velocity, $\alpha_2$, observed at, for example, 16,000 ft/sec, a Poisson's ratio, $\sigma_2$, measured or assumed at 0.27 (or R = 3.1), a known fluid compressional velocity, $\alpha_1$, at 5,000 ft/sec and a density ratio $\rho_2/\rho_1$, measured or assumed on the basis of $\alpha_2$ at 2.2. The latter density ratio value may be obtained from a density log for the standard formation.

With these values, the relative shear modulus $\mu_2/\lambda_1$ is found to be about 7 using Equation 3 and the corresponding relative pressure, as obtained from curve 132.2 in FIG. 6 for the standard formation, is equal to 43.

The use of the calibration curves in FIGS. 5 and 6 commences with a log of the Stoneley wave amplitude. The measured value of the Stoneley amplitude for the standard limestone formation is, for example, 0.049 volts or in some other suitable units. If the amplitude of another formation is measured at 0.011 volts, the relative pressure value for this formation is 0.011/0.049 × 43 = 9.67. (43/0.049) is the calibration factor for the standard formation.)

Applying the value 9.67 to the curve 132.2 of FIG. 6 yields a relative shear modulus, $\mu_2/\lambda_1$ of 2.9.

From that value of relative shear modulus one may derive the shear velocity, $\beta_2$, and the Poisson ratio, $\sigma_2$, using a density ratio $\rho_2/\rho_1$ obtained from a density log for the same formation. Assuming that the density ratio $\rho_2/\rho_1$ is measured at 2.48, then the shear velocity $\beta_2$ is determined using the relationship of equation (2) and is equal to about 5,400 ft/sec.

The function curves of FIGS. 5 and 6 respectively illustrate a sensitivity to borehole diameter and frequency. In the formation of a shear modulus function signal with network 134 of FIG. 1 for a late arrival wave, a correction signal is obtained from a network 136 responsive to a borehole diameter signal on line 138 and a frequency signal on line 78. The extent of the correction signal is determined by the sensitivity of the function curves 130, 132 to variations in the borehole diameter and center frequency of the energy in the passband of filter 66.

The Stoneley wave amplitude generally varies inversely with the square of the radius of the borehole and thus the caliper signal obtained with the caliper 50 on tool 10 in FIG. 1 is used to compensate the measured Stoneley amplitude for uniform changes of borehole size. The caliper or borehole size compensation can be applied when a Stoneley wave amplitude log 100 is produced. The caliper signal may be derived directly with tool 10 or derived from a previous record of an investigation of the borehole for which the Stoneley amplitude log 100 is made.

The amplitude log 100 is relatively insensitive to density variations, where rock densities are from 2 to 2.5 times the density of mud. In unusual situations such as for rocks of very large porosity and thus low densities, the Stoneley wave amplitude shows a change in value and the calibration factor of the Stoneley wave amplitude relative shear modulus curves 130, 132 may be decreased accordingly.

The selection of the center frequency of filter 66 or the value of the signal 78, is made to obtain a useful signal to noise ratio for the Stoneley amplitude. When, for example, the formation is soft, corresponding to a low relative shear modulus, the amplitude of the Stoneley may show a significant drop. As can be appreciated from the curves 130 in FIG. 5, an improvement in the Stoneley wave amplitude can be obtained by shifting to a lower frequency. One may employ a transit travel measurement for the compressional wave to identify the need to shift to a lower frequency for filter 66 and thus improve the signal to noise ratio of the Stoneley wave amplitude signal. Generally, when the compressional transit travel time, $\Delta TC$, increases, a lowering in the frequency of the filter is desired. Stoneley amplitude sensitivities to density variations may be compensated for by reducing the frequency of filter 66 with increasing density.

The advantage of low frequency enhancement of the Stoneley amplitude signal is preferably carried out by selecting a frequency which is still above a cut-off region for the Stoneley wave in formations having a low relative shear modulus. Such cut-off arises when the Stoneley phase velocity approaches the shear wave velocity when the latter drops below the velocity of the mud in very soft formations.

FIGS. 7, 8 AND 9

In FIG. 7 an analog sonic waveform processor apparatus 160 is shown wherein different frequency bands of the Stoneley wave segment of waveforms may be displayed and used to derive a log which is similar to the centroid log 102 and the Stoneley amplitude log 100 of FIG. 1. The devices designated by numerals which have been previously described in connection with FIG. 1 perform similar functions.

The output on line 27 from time gate 26 is a waveform segment for a late arrival such as the Stoneley wave. The selected waveform is applied to three variable passband filters 162.1, 162.2 and 162.3 to respectively select low, center and high band segments. Filters 162 may be similar to passband filter 66 as described with reference to FIG. 1. The output of filters 162 are each applied to an energy detector 164 which produces on an output line 166 a signal indicative of the energy in the frequency band of the associated filter 162.

The outputs 166.1 and 166.3, corresponding to the low and high frequency filter outputs, are applied to a signal comparator 168. The output 170 of the comparator 168 is an error signal whose magnitude is representative of the difference in the amount of energy in the filter outputs. The polarity of the signal on output 170 is indicative of which filter 162.1 or 162.3 has the largest amount of energy.

The output of comparator 168 is then added or subtracted, as the polarity of the error signal may require, in a summing network 172 with a reference signal derived on output line 174 from a high frequency passband reference source 176. Source 176 generates a signal selected to locate the center frequency of the high passband filter 162.3 at an initial desired value which corresponds with the high end of the frequency spectrum of the segment of the waveform passed by time gate 26. The output on line 178 from summing circuit 172 is a high frequency control signal whose magnitude controls the location of the passband of the high frequency filter 162.3.

The low frequency passband filter 162.1 is controlled in frequency in a similar manner as filter 162.3 but with a low frequency reference source 180 whose output 182 is applied to a summing network 184 together with the error signal on line 170 from comparator 168. Summing network 184 produces a low frequency control signal on output 186 to control the frequency position of the low band filter 162.1 to a value which corresponds with the low end of the frequency spectrum of the waveform passed by time gate 26.

The low and high passband frequency control signals on lines 186 and 178 are also coupled to a summing network 188 whose output is applied to a multiplier 190. The multiplier is selected to provide a suitable correction factor needed to obtain a center frequency control signal on output line 192 representative of the described frequency for the center passband filter 162.2.

The multiplier 190 is preferably selected so that the frequency of the center passband filter 162.2 is midway between the other passband filters 162.1 and 162.3. In such case, assuming a linear relationship between the low and high frequency control signals, a multiplier factor of one-half will maintain the frequency of the passband of filter 162.2 midway between the passbands for filters 162.1 and 162.3. The center frequency control signal on line 192 may then be used as an indication of the centroid of the waveform segment passed by gate 26 and logged on a plotter 194.

In the operation of apparatus 160, the values of the low frequency reference signal 180 and high frequency reference signal 176 are selected so that the filters 162.1, 162.3 are initially set with their passbands at frequencies as indicated at 196 and 198 in FIG. 8. This places the passband for the center filter 162.2 at a location as indicated at 200 in FIG. 8.

When a waveform segment is applied on line 27, it may have a frequency spectrum of a type such as shown by the envelope curve 202 in FIG. 8. The shape of the envelope 202 is a function of several factors such as the excitation functions for the transmitter pulse and the Stoneley wave as well as the response characteristic of the receiver system. Since the transmitter source function does not include energy at zero frequency, the envelope 202 has an appearance which is generally a combination of the receiver system response curve 36 and transmitter excitation function 34 shown in FIG. 4.

The outputs of energy detectors 164.1 and 164.3 are compared to develop an error signal on line 170 representative of the difference in magnitude of energy in the passbands of filters 162.1 and 162.3. For the relative amplitudes or energy in the passbands 196, 198 in FIG. 8, the error signal is of such polarity that its effect on the high and low passband frequency control signal causes a lowering in the frequencies of the passbands for both filters 162.1 and 162.3 to the positions indicated at 196' and 198' where the error signal on line 170 reduces to a minimum value since the amplitudes from detectors 164.1 and 164.3 are of equal value. This causes a corresponding shift of the passband of the center band filter 162.2 to a frequency position as indicated at 200'.

The center passband frequency control signal is construed as the frequency region where the dominant energy of the waveform segment is located. Hence, the center passband frequency control signal is employed as an approximate measurement of the centroid of the waveform segment. When the frequency spectrum of the waveform segment is symmetrical, then the signal on line 192 is close to the actual centroid. When the spectrum is asymmetrical as shown by envelope curve 202, the value of the center frequency control signal on line 192 can be a reasonable approximation of the centroid frequency for the waveform segment.

The output of the center passband energy detector 164.2 may be employed as a source for recording a log for the amplitude of the Stoneley wave by applying line 166.2 to the input of a summing network 204. A borehole diameter compensation signal from a borehole diameter function generator 206 may be added to the summing network 204 to provide an amplitude log for which effects from borehole diameter changes, as sensed by caliper 50, have been reduced. The magnitude of the borehole diameter compensation signal may be derived from a set of curves such as 132 in FIG. 6 where the effect of variations of borehole diameter on the Stoneley amplitude are plotted.

In the embodiment 160 for generating a log of the amplitude of a late arrival and its centroid the analysis of a waveform segment may be done in real time, i.e. while the waveforms are being generated by actuation of the transmitter 16. It should be understood, however, that the waveform segments may be produced from previously recorded records which are being played back such as from an analog or digital tape record. The playback of each waveform segment may be repeated a number of times to enable the frequency control signals to stabilize.

FIG. 9 illustrates another technique 206 for determining a centroid of waveforms for a log such as 102 shown in FIG. 1. At step 210 waveforms such as 38 in FIG. 3 are converted into samples with a suitable analog to digital converter. The waveform samples are preferably in a form which enables a signal processor such as the PDP-11/45 provided by the Digital Equipment Corporation to determine the centroid for any desired segment of the sampled waveforms.

Portions of the samples are then selected at step 212 by extracting samples in a window. The window's location is determined in a manner which follows the implementation of the time gate 26 as described with reference to FIG. 1 for the extraction of a late wave arrival such as the Stoneley wave segment.

At step 214 the samples in the window are subjected to a fast fourier transformation to obtain signals representative of the frequency spectrum of the extracted late arrival. The detailed process steps for implementing a fast fourier transformation are well known in the art as can be seen, for example, from Part 2 in a publication entitled "Digital Processing" edited by Rabiner and Rader and published in 1972 by The Institute of Electrical and Electronics Engineers, Inc. From the fourier transformation the frequency region or frequency where a predetermined amplitude value such as the maximum, $f_c$, occurs is determined. From this determined frequency value a region of interest is selected by choosing low and high frequency limits, $f_{hi}$ and $f_{lo}$. The frequency limits may, for example, set a bandwidth of $\pm 25\%$ around the maximum amplitude frequency value $f_c$.

Thereupon a moment, M, of energy, E, is computed at step 216 by multiplying the value of the amplitude of the transformed waveform and integrating this multiplication over the frequency range of interest. The moment M is then divided by the amount of energy, E, in the frequency range as determined at step 218. Expressed in mathematical terms, the centroid value, C, for each waveform as determined at step 220 is obtained by the relationship $$C = \frac{M}{E} = \frac{\int_{\Delta f} f \cdot E \cdot df}{\int_{\Delta f} E \cdot df}$$

Since the process steps in FIG. 9 are for a digital processor, the steps 216, 218 for carrying out the integrations are identified as summations over the frequency range set at the low end by value $f_{lo}$ and at the high end by $f_{hi}$. The final value of the centroid, C, may then be recorded such as by plotting at step 222 in the form of a log 102 shown in FIG. 1.

FIGS. 10, 11A, 11B, 12 AND 13

The late arrival wave excited and extracted with the techniques heretofore described may be employed to determine inelastic properties of the formation or borehole wall through which the acoustic waves travel. For example, when several methods for measuring the same formation parameter are available, then a comparison of these separate measurements may reveal inelastic properties. Inelastic properties of interest may be those such as the deterioration of the hoop strength or stiffness of the wall of the borehole or the extent of fracturing of the formation or permeability of the formation.

Thus, with reference to the technique 240 shown in FIG. 10, two measurements of a shear modulus are made and compared. In one measurement branch 242, a circumferential shear modulus is determined using a late arrival excitation and extraction technique. In another measurement branch 244 the shear modulus of the formation is determined by extracting and measuring the shear arrival and its transit travel time. The separately measured shear moduli are then compared at step 246 to determine an inelastic property at step 248.

In the technique 240 shown in FIG. 10 the waveforms may be produced with a tool 10 as shown in FIG. 1 and initially converted to sampled form at step 250 with an analog to digital converter. The waveforms may be produced from a record such as an analog tape. In the branch 244, techniques as described in the aforementioned copending patent application with greater detail, are used at steps 252 and 254 to produce indications of the compressional and shear wave, velocities $V_c$, $V_s$ respectively. A value of shear modulus is then computed at step 256 by using the relationship $$\mu = \rho V_s^2$$

where $\rho$ is the bulk density of the formation and is obtained from a density log.

In the other branch 242, the circumferential shear modulus is determined following steps as previously described for using the amplitude log of the Stoneley wave. Thus, at step 258, those waveform samples which fall within a time window which includes the Stoneley wave are extracted. The extracted waveform samples are transformed into the frequency domain and a frequency band of interest selected at step 260.

If necessary, adjustments may be made for borehole characteristics at step 262 such as the diameter. The magnitude of the adjustment may be derived from curves such as 132 shown in FIG. 6 and from the fact that the Stoneley amplitude varies inversely with the square of the radius of a borehole for uniform borehole size changes. The amplitudes of the samples in the selected frequency band are appropriately changed to make the correction. The Stoneley wave amplitude is determined at step 264 by summing the amplitudes of samples in frequency band.

The relative Stoneley amplitude is determined at step 266, by dividing the Stoneley amplitude by a Stoneley reference value which is known for a reference formation. The relative Stoneley amplitude is then modified at step 268 with a curve such as 130 in FIG. 5 to identify the relative shear modulus $\mu_2/\lambda_1$. Step 268 may be done by looking up in a memory the appropriately stored values of a curve 130, corresponding to the frequency band selected at step 260, or applying a function former network such as 134 in FIG. 1. The circumferential shear modulus is determined by multiplying the relative shear modulus with the value of the known compressional modulus $\lambda_1$ for the borehole fluid at step 270.

The shear moduli values determined at steps 256, 270 may be compared at step 246 and the difference used at step 248 to determine an inelastic parameter.

In such comparison, one may expect, for example, that in a highly layered structure the longitudinal shear modulus measured in branch 244 of the method in FIG. 10 is substantially lower than the shear modulus concerned with the circumference of the borehole as measured with the technique 242 in FIG. 10. When, in fact, the comparison reveals a circumferential shear modulus which is significantly less than the longitudinal shear modulus, one may attribute the measurement to an inelastic shear behavior such as uncompaction.

Figure 14:
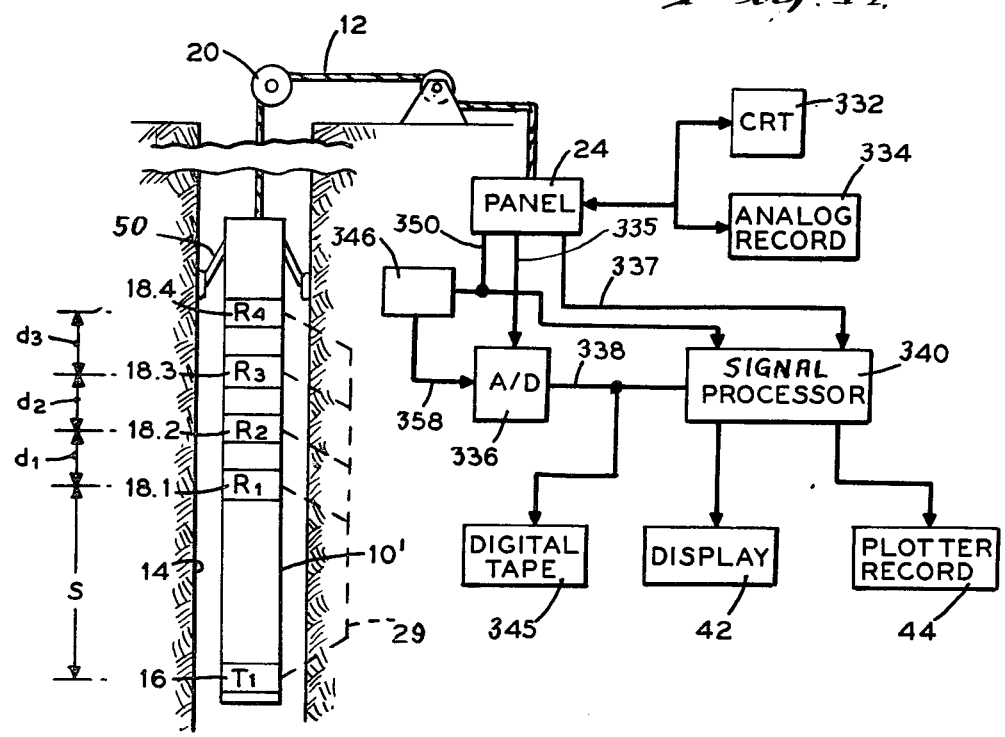
FIG. 14 is a schematic block diagram representative of another acoustic borehole investigating apparatus for exciting, extracting and displaying a late arrival wave in accordance with the invention.

A technique for determining a parameter in an acoustic borehole investigation involves a measurement of waveform behavior as a function of frequency for a sonic wave such as the Stoneley wave. The technique may utilize a tool such as 10 shown in FIG. 1 with a single receiver or with more than one receiver 18. A tool using a pair, or three or four receivers as shown in FIG. 14, may be used. Thus, with reference to FIG. 11A, four frequency envelope spectra 280 of sonic waves from respectively different receivers 18 are illustrated for a four receiver tool as shown and more particularly described with respect to FIG. 14. FIG. 12 shows a spectrum 282 from a single receiver.

The spectra 280, 282 may be obtained, for example, by forming an appropriate Fourier transform on the selected portion of a waveform known to include a late arrival such as the Stoneley wave. The low frequency side 284 of the spectra is primarily a function of the low frequency fall-off characteristics of both the transmitter excitation pulse and the receiver system frequency response. Although, it is preferred that such low frequency fall-off occurs at a very low frequency so as to avoid equipment limitations in the use of a late arrival wave at the low frequency side 284, practical considerations may dictate use of the spectrum in the bands 286, 288 as suggested in FIG. 12.

Figure 13:
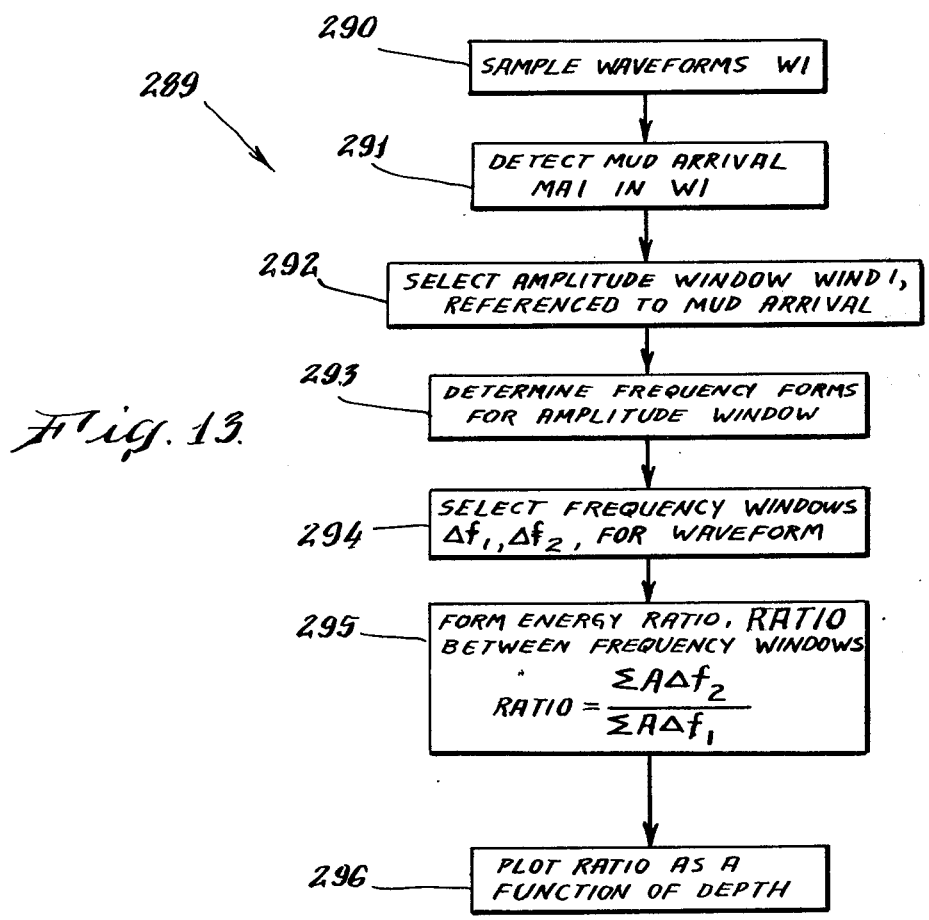
FIG. 13 is a flow chart of steps illustrating a method to determine a parament of the formation from the frequency behavior of a late arrival.

In accordance with one technique 289 shown in FIG. 13, an energy ratio is formed between two frequency bands 286, 288 as a general measurement of the shape of the spectrum 282. The energy ratio may be identified as indicative of the relative shear modulus for a particular type of rock.

In FIG. 13 steps for practicing a technique 289 for obtaining an energy ratio are shown. The technique 289 shown in FIG. 13 may use a signal processor as previously identified for which, as a first step 290, the waveforms from a receiver are sampled, though as can be appreciated, one may commence with previously sampled waveforms. Each sample has a known index position relative to a common time such as the occurrence of the transmitter pulse which caused the sampled waveform.

At step 291 the mud arrival is detected by using a technique based upon the known transit travel time of the mud wave. When more than one receiver is employed such as with the tool shown in FIG. 14, a correlation technique as described in the aforementioned copending application can be used to precisely locate the mud arrival in a waveform. The index position of such mud arrival is then identified.

At step 292 an amplitude window for a predetermined number of samples occurring after the index position of the detected mud arrival is selected and used to produce a Fourier transformation at step 293.

The frequency windows $\Delta f_1$ and $\Delta f_2$ respectively corresponding to bands 286, 288 are selected at step 294 and an energy ratio of the energy in windows $\Delta f_1$ and $\Delta f_2$ formed at step 295. The energy ratio is formed by initially summing the amplitudes, A, in the respective energy bands 286, 288. The energy ratio is then computed in accordance with the relationship $$\text{RATIO} = \frac{\Sigma A_{\Delta f_2}}{\Sigma A_{\Delta f_1}}$$

The value for RATIO may then be plotted at step 296 as a function of depth to form a log representative of an elastic constant such as the shear modulus.

Figure 11A:
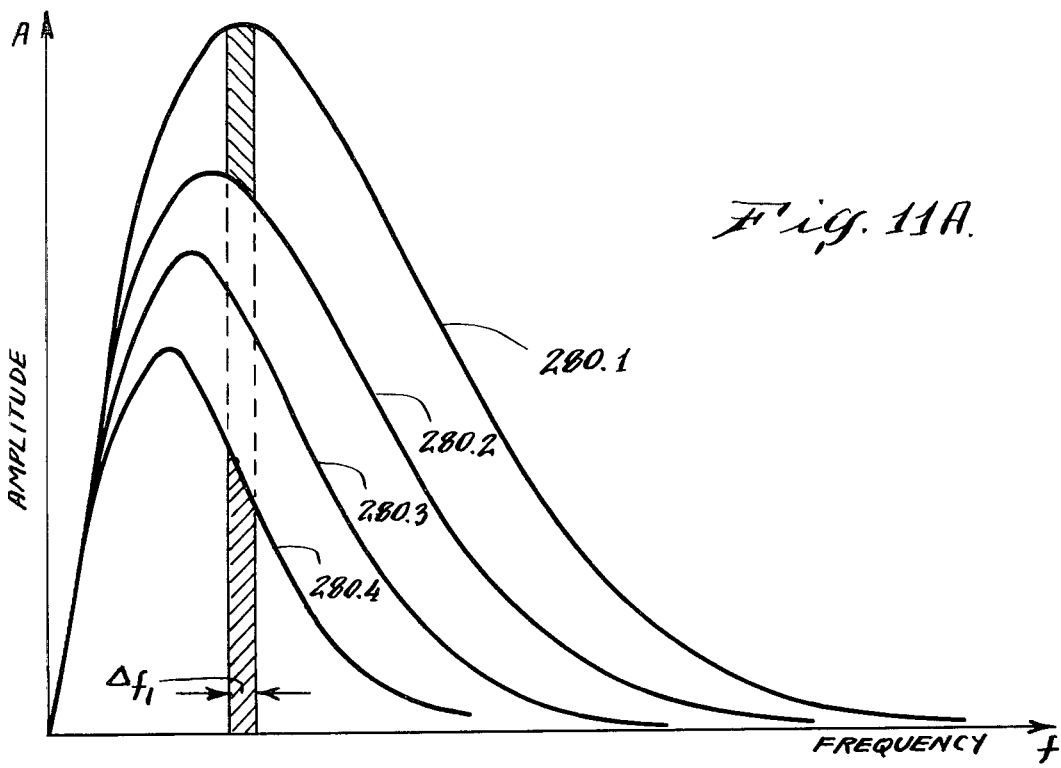
FIG. 11A is an amplitude frequency plot representative of spectra from outputs of receiver with different spacings.
Figure 11B:
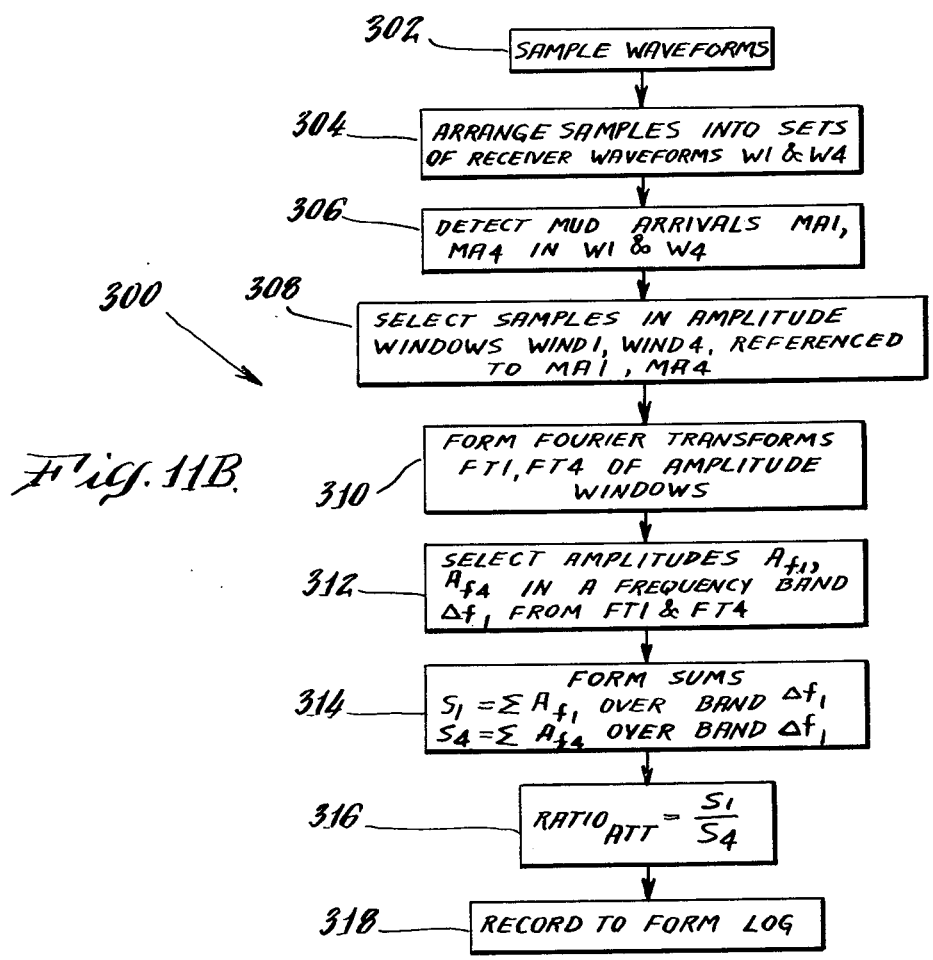
FIG. 11B is a flow chart of steps illustrative of a method to determine attenuation in the frequency domain of a late arrival.
Figure 12:
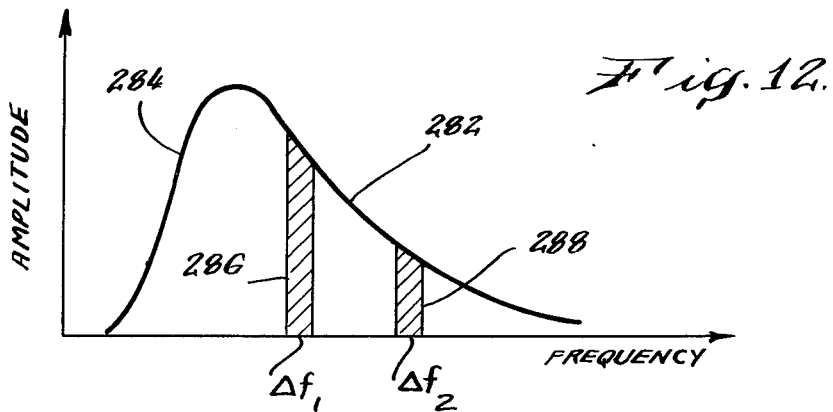
FIG. 12 is an amplitude frequency plot representative of the spectrum of a selected late arrival segment from a receiver.

With reference to FIGS. 11A and 11B, a technique is disclosed for determining attenuation of the Stoneley wave. In theory, the Stoneley wave does not attenuate. When instrument caused amplitude variations are removed from the measurements, any remaining attenuation is a measurement of inelastic behavior of the borehole medium.

The receiver spectrum curves 280 shown in FIG. 11A reveal different amplitudes illustrative, for example, of an attenuation of the Stoneley wave as it travels past the four receivers 18 of a tool as shown in FIG. 14. The spectra 280 in FIG. 11 are generated from the segments of the receiver waveforms in which the late arrivals occur.

The technique 300 shown in FIG. 11B is used to derive an attenuation measurement of a late arrival and may be performed with a digital processor. The technique 300 commences at step 302 by sampling the waveforms produced either directly from the receivers 18 or from a suitable prerecorded record of waveforms.

The samples at step 304 are arranged into sets of receiver waveforms, W1, and W4, corresponding to receivers 18.1 and 18.4, see FIG. 14. The index positions of the samples relative to a particular time such as the transmitter pulse are thereby established. Reference to the aforementioned copending patent application may be had for further details in the processing of samples.

The mud arrivals MA1 and MA4 in waveforms W1 and W4 are detected at step 306 in a manner as described with reference to step 291 in the technique shown in FIG. 13. A predetermined number of samples which include the late arrivals are then selected at step 308 by defining selection windows, WIND1 and WIND4, for the respective waveforms W1 and W4.

The selected late arrival samples in the windows WIND1 and WIND4 are then subjected to a fast Fourier transformation at step 310 to obtain amplitude-frequency transforms FT1 and FT4 whose spectra 280.1 and 280.4 are illustrated in FIG. 11A.

Portions of the spectra of the transformed waveforms and located in a common frequency band $\Delta f_1$, are selected at step 312 from the respective transforms FT1 and FT4. The amplitude values, $A_{f1}$ and $A_{f4}$, both in the common band $\Delta f_1$ of the separate spectra 280.1, 280.2 are summed at step 314 to generate sums S1 and S4 representative of the amplitude of the Stoneley wave in the common band.

A ratio, $RATIO_{ATT}$, between sums S1 and S4 is taken at step 316 to provide an indication of the amount of attenuation in the Stoneley wave. The ratio may be compensated for instrument variations or directly recorded at step 318 to form a Stoneley wave attenuation log. Attenuations in excess of an amount which may be attributed to variations in equipment are measurements of inelastic behavior of the borehole media through which the Stoneley wave has traveled.

The selection of the passband $\Delta f_1$ in the technique 300 of FIG. 11B is preferably in that region of the spectra where the bandwidth limitations of the transmitter excitation function and the receiver system have a minimum effect. Several bands may be investigated and the band selected having the best signal to noise ratio. Furthermore, the technique 300 is described as being effective between the two of four receivers of largest spacing in the tool of FIG. 14. It should be understood, however, that any pair of receivers 18 may be employed to make the attenuation and thus inelastic behavior determination.

FIGS. 14, 15, 16, 17, 18, 19 AND 20

With reference to FIG. 14, a sonic borehole logging tool 10', as described in the aforementioned copending patent application, is shown suspended from a cable 12 in a borehole 14. The tool 10' includes a transmitter 16 located at the bottom of the tool and four selectively spaced sonic receivers, 18.1, 18.2, 18.3 and 18.4. The panel 24 includes suitable amplifiers, switching circuits and electrical supplies for tool 10' and the firing of sonic transmitter 16. The tool 10' includes amplifiers and controls needed to enable receivers 18 to sequentially detect sonic waves and provide panel 24 with waveforms representative of the acoustic waves incident upon transducers in receivers 18.

In the operation of the sonic logging tool 10', the transmitter 16 is regularly energized (about ten times per second) to produce each time a sonic pulse such as 28 shown in FIG. 2 while the tool is moved upwardly at a speed of the order of a foot per second. Each pulse 28 is directed at the formation in which an acoustic wave is launched. The acoustic wave traveling along path 29 has components which proceed both through the formation and the borehole towards the receivers 18. Wave components incident upon the receivers 18 produce a set of waveforms such as 330.1, 330.2, 330.3 and 330.4 shown in FIG. 15. Waveforms 330 include those sonic waves which, after travel through the borehole, fluid and/or borehole casing as the case may be, are incident upon receivers 18. The transmitter 16 and receivers 18 are of the type as previously described with reference to FIGS. 1-4.

Although the transmitter is regularly activated, the receivers 18 preferably are alternately enabled to generate waveforms in the sequence as shown by waveforms 330.1-330.4. In this manner, waveforms which are of several milliseconds duration can be analyzed to detect acoustic waves in various waveform segments such as those reflecting the presence of early wave arriving compressional and shear waves or late arriving Stoneley waves. In addition, the sequential enabling of receivers 18 allows their outputs to be multiplexed onto a common line towards panel 24. This is an advantage when the analog form of the outputs of receivers 18 is to be conducted to panel 24 since the analog waveforms 330 are all exposed to the same electronic amplification and cable attenuation to enable comparative amplitude comparisons. The advance of the tool 10' during the time needed to generate one complete set of waveforms 330 can be controlled to effectively enable sonic investigation at determinable depths.

The receivers 18 each bear a known spacing "d" from each other while the distance "S" between the nearest receiver 18.1 and transmitter 16 is accurately known to further precisely locate all the receivers from transmitter 16. When, for example, the arrival of the compressional wave is precisely detected at each receiver, then the time between respective receiver arrivals provides an accurate determination of the transit travel time of the compressional wave. By employing a multiple number of receivers 18 such as four with tool 10', accurate and reliable determinations of wave velocities can be made.

The waveforms 330 may arrive at the panel 24 either in analog form or in sampled form. For example, the tool 10' may be provided with an analog to digital (A/D) converter to sample waveforms 330. The samples are then transmitted along cable 12 to panel 24 for further processing.

As previously mentioned in this invention, waveforms representative of sonic waves may be produced in analog form such as from an analog record 334, or directly from receivers 18. Alternatively, the waveforms may be produced in sampled or digitized form from a previous recording or from an A/D converter 336 located either near panel 24 as shown in FIG. 14 or downhole with tool 10'.

When the waveforms 330 are being generated by tool 10', they may be coupled to a cathode ray tube 332 for real-time analog display and to analog recorder 334. The waveforms 330 may also be processed in sampled form by coupling the analog waveforms along a line 335 to analog to digital converter 336 which generates samples of the waveforms at a high sampling rate on an output line 338.

The output samples from A/D converter 336 are applied to a signal processor 340 which processes the samples to extract desired arrivals and produce acoustic wave parameter values of a sonic waveform 330. A processor 340 which has been found suitable is a digital processor known as the PDP-11/45.

During the firing of transmitter 16 and sequential enabling of receivers 18, electronics in tool 10' provides receiver waveform identification signals which may be coded pulses such as a two bit code word. Such receiver waveform identification code, together with a pulse to identify the firing time of the transmitter 16 are delivered along cable 12 to a panel 24 and from there along line 350 to a conversion control network 346 and signal processor 340. Various display and recording devices may be used such as a magnetic recorder 345 for storing waveform samples produced by A/D converter 336, or for a display 342 of parameters generated by processor 340 or for logs such as 90 as shown in FIG. 1 formed with a plotter 344.

The conversion control network 346 enables a selective delay of the actuation by the A/D converter 36 in correspondence with the receiver waveform which is to be sampled. For example, if receiver waveforms 330 shown in FIG. 15 are each sampled by starting the same amount of time after the firing of transmitter 16 or upon occurrence of its output pulse 28, the amount of useful waveform samples will vary as a result of receiver-transmitter spacings. In order to preserve the end segments of the waveforms for subsequent analysis, conversion control network 346 is used.

Figure 16:
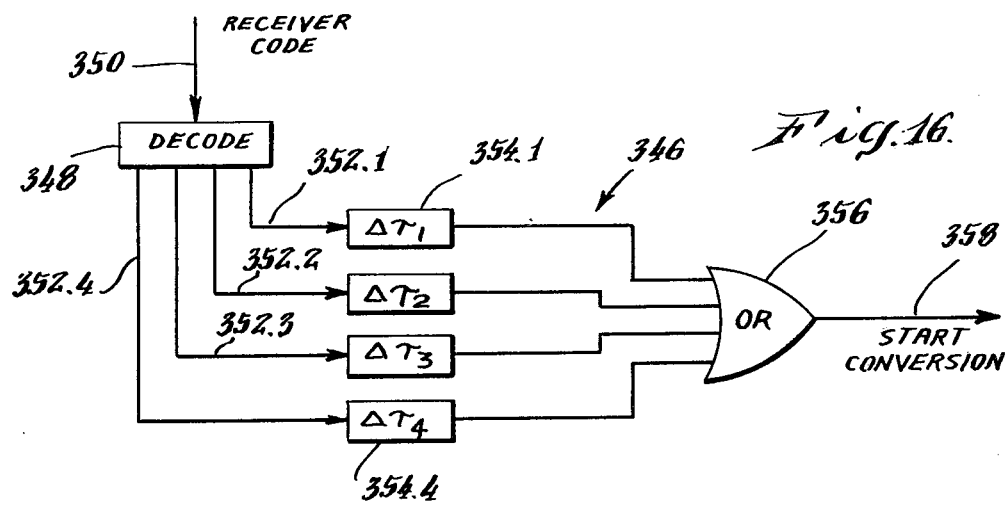
FIG. 16 is a schematic block diagram exemplary of a conversion control network for use with an apparatus shown in FIG. 14.

As shown with greater detail in FIG. 16, network 346 includes a decode circuit 348 responsive to receiver waveform identification signals on line 350. The decode circuit 348 generates pulses on lines 352 representative of the particular activated sonic receiver 18. Each receiver identification pulse initiates a delay circuit 354 to inhibit actuation of the A/D converter 336, see FIG. 14, until such time when the earliest part of interest of an acoustic wave could arrive. Thus, as shwon with waveforms 330.1 and 330.2 in FIG. 15, the A/D conversion for each receiver waveform is delayed a known time, $\Delta\tau_1$, which is a function of the distance between receiver 18 and transmitter 16 and the fastest expected velocity of the acoustic wave.

The delay $\Delta\tau_1$ for the first sonic receiver is selected equal to $(\Delta T_o \times S) - K$ where $\Delta T_o$ is the fastest compressional wave interval transit time in microseconds per foot, S the distance between receiver 18.1 and transmitter 16 and the value of K is selected sufficient to commence the conversion process at least a small known instant before wave arrival. The delays of the conversion of electrical waveforms from the other receivers 18 are determined in a similar manner. Hence, for a spacing of S equal to 8 feet, the spacings "d" of one foot each, and with a value of K equal to 12 microseconds, $\Delta T_o = 40\mu$ sec/foot, the respective delays from the time of firing of any transmitter pulse 26 are $\Delta\tau_1 = 308\mu$ seconds, $\Delta\tau_2 = 348\mu$ seconds, $\Delta\tau_3 = 388\mu$ seconds and $\Delta\tau_4 = 428\mu$ seconds.

These delays may be obtained using logic or analog delay circuits. The delays, once set, should remain constant so that index values employed in the operation of signal processor 340 are referenced to a common time such as the transmitter pulses 28. The outputs of delay circuits 354 may be combined with an OR circuit 356 to provide the desired enabling pulse on line 358 to commence A/D conversion.

The A/D converter 336 commences conversion at the end of each delay $\Delta\tau$. The conversion process continues for a sufficient time period to provide samples of the portions of the waveforms of interest. When a sampling rate of four microseconds is employed, a total of 512 samples, or about two milliseconds of waveform duration, is sufficient in many cases to determine acoustic wave parameters for such sonic waves as the compressional, shear and Stoneley waves. The number of samples used in any one group may be varied with 512 being generally used herein as an illustrative example. The number of samples is likely to change with the sampling rates with a greater number of samples being used with faster sampling rates and less samples with a slower rate. Hence, A/D converter 336 is provided with a suitable counter (not shown) which terminates the conversion process when the desired number of samples 360 (see FIG. 15) have been generated. The A/D conversion of each waveform 330 results in the generation of a group identified at 362 in FIG. 15 of 512 samples 360.

Since each sample 360 occurs at a known sampling rate, any one sample has an index value which can be directly related to the time interval measured from the time of occurrence of the sonic pulse 28 which causes the waveform. Thus, the first sample 360.1 in group 362.1 occurs at a time equal to $\Delta\tau_1 + (N \times SR)$, where N is the index position value (N = 0 for the first sample) and SR is the sampling rate in microseconds. In a similar manner, each sample 360 in the other groups 362.2, 362.3 and 362.4 can be precisely related in time to the regularly recurring sonic pulses 28.2, 28.3 and 28.4.

Thus, if a first part in the compressional wave is detected for the sample in group 362.1 at index value N1, and in group 362.2 at index value N2, then the time $\Delta T$ for that wave to travel the distance between receivers 18.1 and 18.3 is equal to $(N2-N1)SR + (\Delta\tau_2 - \Delta\tau_1)$. With the highest wave velocity value expressed in its reciprocal transit travel time of 40 microseconds per foot and the receiver spacing $d_1$ of 1 foot, and four microsecond sampling rate, the transit travel time of the compressional wave in microseconds per foot is $(N2-N1)\times 4 + 40$.

In some instances, the delay factors $\Delta\tau$ are so set that the A/D conversions for the receiver waveforms each begin at the same interval in time after the occurrence of a sonic pulse 28. In such case, the delay factors $\Delta\tau$ are all, for example, equal to zero or $\Delta\tau_1$. The measurement of a wave transit time may then be made directly by subtracting the indices for the first detections and multiplying the difference by the sampling rate.

The samples applied to processor 40 are assembled in groups of 512 samples with each group properly coded to identify a waveform from a particular receiver. The processor 340 is provided with a buffer to enable accumulation of a pair of sets of waveforms, wherein each set represents waveforms from all four receivers during a full operational cycle of the transmitter-receiver. Access to the buffer is under control by A/D converter 336 to enable transfer of the samples as they are produced.

The waveforms 330, see FIG. 15, generated with tool 10' are processed in a manner as described in the aforementioned copending patent application to obtain travel transit time logs 92, 94 for $\Delta TC$ and $\Delta TS$ as shown in FIG. 1.

Figure 17:
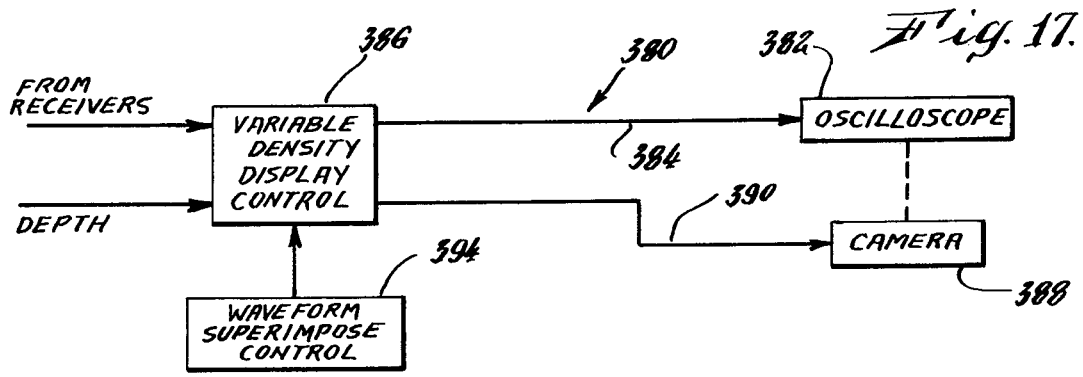
FIG. 17 is a schematic block diagram illustrative of an apparatus for generating a variable density log.

The variable density log 90 shown in FIG. 1 may be obtained with a suitable digital plotter adapted to record outputs from processor 340 or with a variable density plotter 380 as shown in FIG. 17. The variable density plotter 380 may be as described and shown in FIG. 1 of U.S. Pat. No. 3,680,042. As described in this patent, a variable density log is obtained by modulating the intensity of an oscilloscope 382 with the waveform applied on a line 384 by a variable density display control 386. A camera 388 records the waveform trace and the film on the camera is advanced by a signal on line 390 to record the next waveform.

Figure 18:
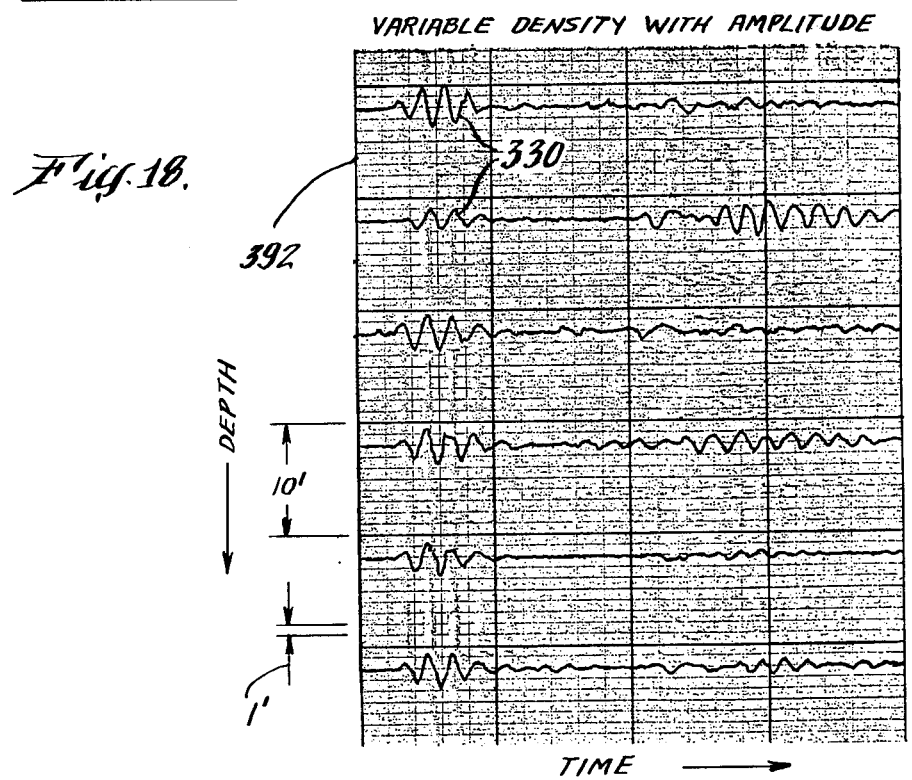
FIG. 18 is a varible density log with superimposed amplitude receiver waveforms.

In some instances it may be desirable to record a waveform, such as 330 in FIG. 15, over a variable density log 392 as shown in FIG. 18. In such case the intensity modulation is interrupted with a superimposed control 394 (such as by changing the position of switch 15 described and shown in FIG. 1 of U.S. Pat. No. 3,680,042). When such switch is changed, the waveform amplitude is applied to the y or amplitude modulation input of the oscilloscope 382 to trace an appropriate waveform such as 330 over log 392.

Figure 19:
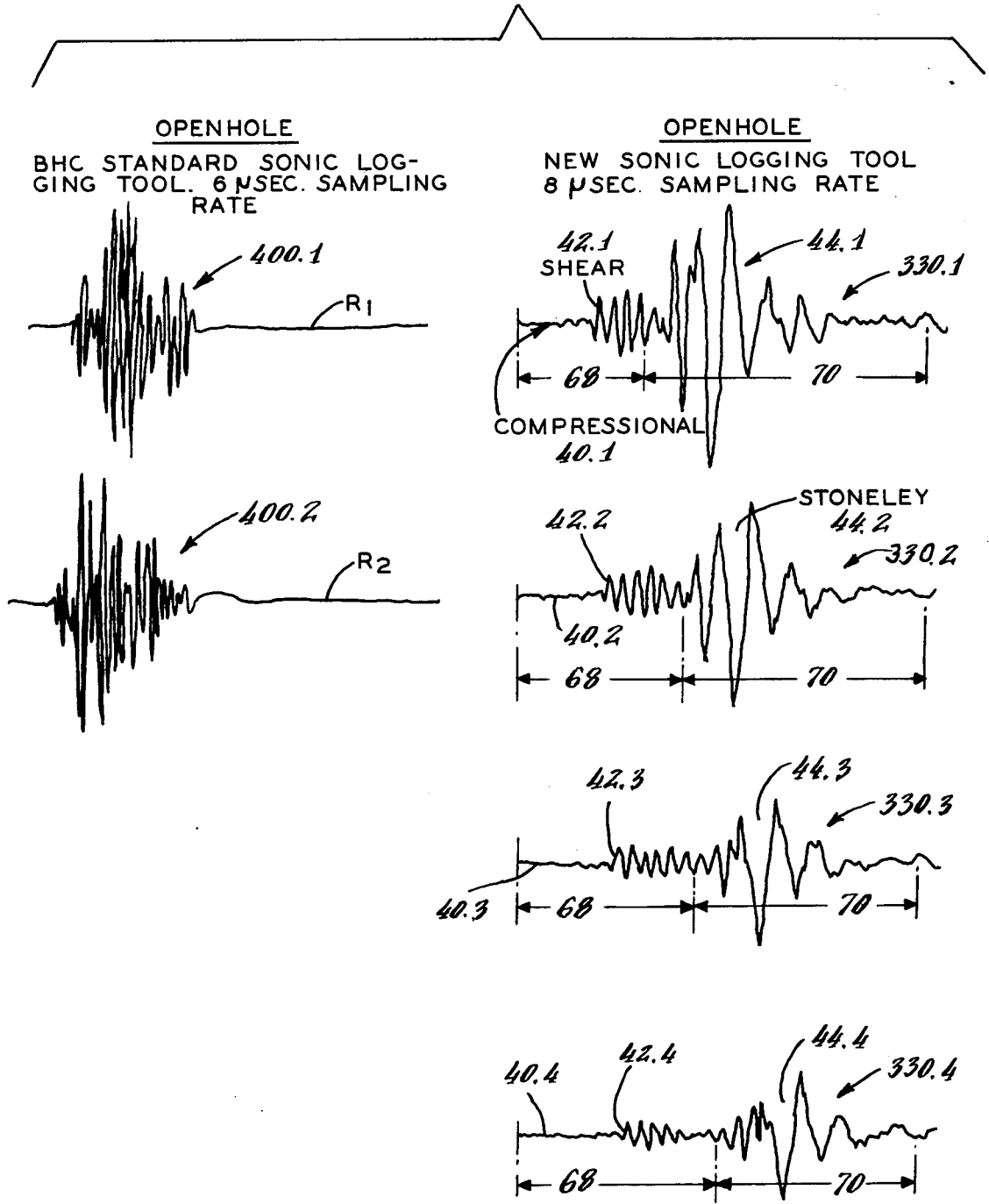
FIG. 19 are sonic waveforms representative of an acoustic borehole investigation with the apparatus shown in FIG. 14.

With reference to the waveforms shown in FIG. 19, a difference is shown between the sonic waveforms produced with a tool 10' in comparison with a set of sonic waveforms 400 obtained with a commercially available sonic borehole logging tool, as shown in the drawing, BHC is a registered mark of Schlumberger Technology Corporation. The latter commercially available tool employed a pair of receivers with a closer spacing between transmitter and receivers than tool 10'. Both sets of waveforms 330 and 400 were obtained for an open hole. The waveforms from the commercial tool were sampled at a 6 microsecond rate and those obtained with tool 10' were sampled at a slower rate of 8 microseconds. Both sets of waveforms were plotted with a digital plotter. The total length of each waveform 330 and 400 is 512 samples so that an approximate equivalent length of about 1 millisecond of the waveforms 400 has actually been recorded with portions at the end of the waveforms 400 having been discarded. Identification of individual waves in waveforms 400 is difficult.

The set of receiver sonic waveforms 300 obtained with sonic logging tool 10' illustrate the result of preferential excitation of late arriving waves. Although waveforms 330 and 400 were not obtained from the same borehole, the waveforms 330 are representative of the advantage of a transmitter producing preferential low frequency excitation and a receiver system of wide bandwidth in a sonic investigation of a borehole with a tool using relatively large transmitter-receiver spacings.

When samples 360 representative of Stoneley waves 44 have been separated from the rest of the waveforms, using a time gate operation as described with reference to FIG. 1, the samples from the various receivers may be used to obtain Stoneley samples of improved signal to noise ratio. For example, the Stoneley samples may be aligned by appropriate shifting in processor 340 of FIG. 14. The aligned samples may then be stacked or summed to obtain a Stoneley waveform whose shape and amplitude have been emphasized to facilitate extraction and utilization. Such processing for signal enhancement appears particularly desirable when soft formations are encountered with low relative shear modulus values.

The Stoneley wave is characterized with a dispersion whereby difference frequencies of the wave travel at different velocities. As a result, the stacking or velocity filtering of the Stoneley wave should take such dispersion into account. The degree of dispersion is determined by the phase velocity of the Stonelely wave as a function of frequency. It appears that the Stoneley phase velocity varies significantly at high frequencies, in the range where the wavelength, $\lambda$, in the mud is in the range of the diameter, d, of the hole or about several times that. At lower frequencies, however, where $\lambda/d \gg 1$ or $\lambda/d$ is greater than about five, the phase velocity varies less with frequency and over small frequency ranges appears essentially constant.

Accordingly, the stacking of Stoneley waves for an enhanced signal is preferably done after selecting a narrow low frequency band in the time selected segments such as with the apparatus shown in FIG. 1. Alternatively, one may stack the Stoneley waves in accordance with a desired phase velocity whose value may be predicted from an assumed Poisson ratio, $\sigma$, the compressional velocity, $\alpha_2$, and the density ratio $\rho_2/\rho_1$ both of which can be measured independently.

The Stoneley wave may be extracted with a velocity filtering technique. Such technique may be executed in a manner as described in the aforementioned copending patent application.

Figure 20:
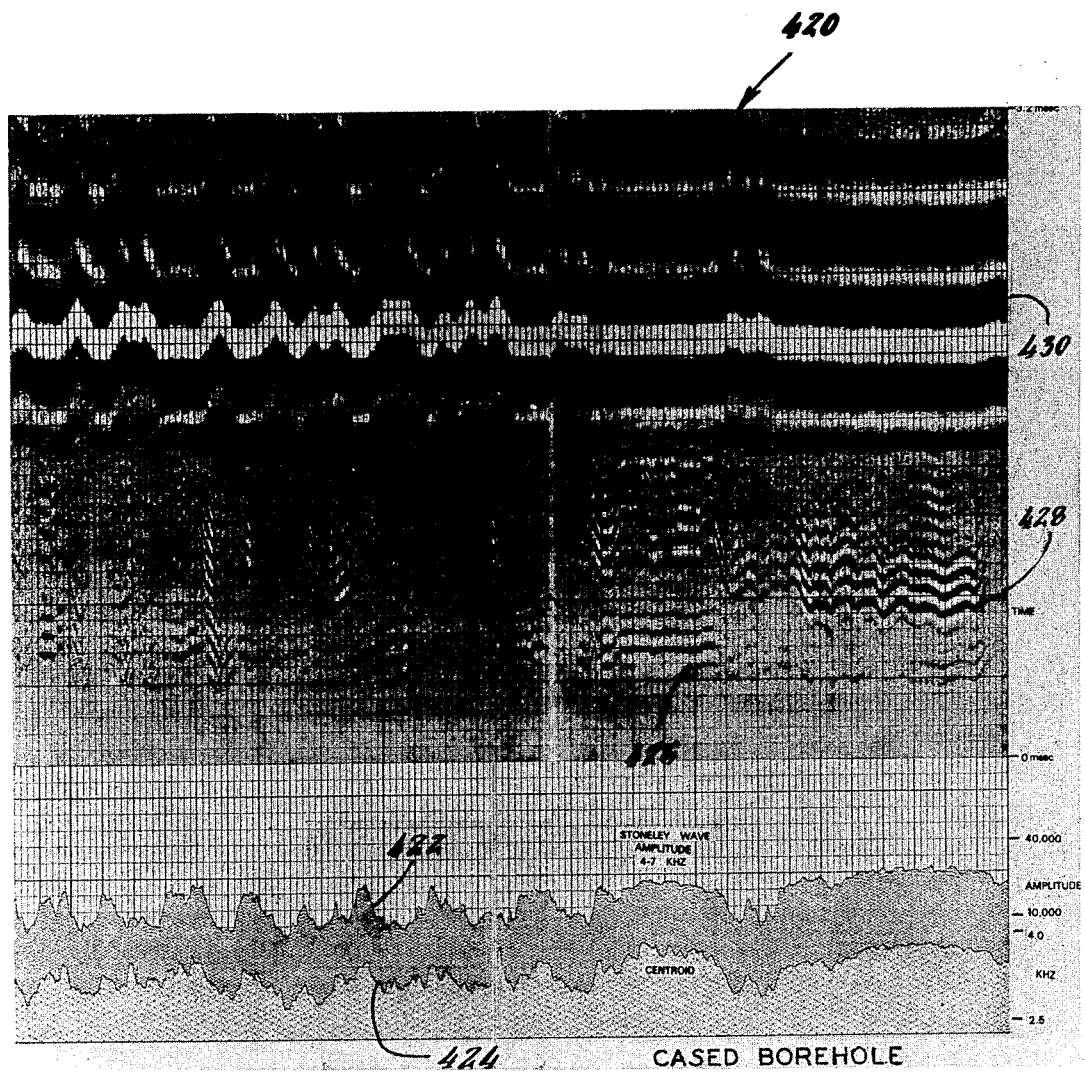
FIG. 20 is a log illustrative of a variable density log with a log of the Stoneley wave amplitude and a log of the centroid frequency of the Stoneley wave.

FIG. 20 shows a variable density log made for a cased borehole. The log 420 was obtained using an apparatus as described with reference to FIG. 14. The VDL 420 is located adjacent a log 422 of the amplitude of the Stoneley wave and a centroid log 424. Casing signals 426 appear quite weak while formation or compressional waves 428 as well as the Stoneley waves 430 can be identified. Note how the centroid log 424 appears to follow the amplitude log 422. The Stoneley amplitude log 422 is for a measurement of the energy in the Stoneley wave over a frequency range from about 4 to about 7 KHz. The centroid log 424 illustrates that the large amplitudes for the Stoneley wave occur in a frequency range between 2.5 and 4.0 KHz.

The Stoneley amplitude log 422 in FIG. 20 may be obtained with the use of processor 340 shown in FIG. 14. The low frequency Stoneley wave in such case may be extracted from the waveform samples by first applying a low pass filter selected to reject high frequency components from earlier arrivals.

A time window is then applied to select the samples corresponding to the Stoneley segment. One method for applying the time window may involve the detection of the sample which reflects a peak of first interest, i.e. a first motion, FM1, as described with reference to step 308 in FIG. 13. The time or number of samples to be counted to locate the Stoneley segment may be done with use of the known transit travel time for the mud or direct arrival. Since the Stoneley wave arrives after the direct or mud wave, the time window may be applied to the samples following the direct or water arrival. The window width may be at least two cycles of the Stoneley wave in duration. An RMS value may then be computed as an energy signal for the Stoneley wave.

The low pass digital filter may be a digital realization of a six pole Bessel filter with a cut-off frequency at about 2.8 KHz. Generally the filter is selected to minimize distortion of the low frequency Stoneley wave and to reject energy from shear, compressional and high frequency Stoneley arrivals. The digital filter enables most of the Stoneley wave energy whose wavelength is greater than about two hole diameters to be used in the computation of the energy amplitude log 422.

Having thus described techniques for preferentially exciting and extracting late arrivals and for determining shear moduli by measuring the energy in selected segments of sonic waveforms, the advantages of the invention can be appreciated. Non-elastic as well as elastic parameters may be determined. Variations of the specific steps and devices described herein may be adopted while remaining within the scope of the invention as set forth by the following claims.

What is claimed is:

1. A method for generating separable early and late arrivals in a waveform representative of a sonic investigation of a borehole, comprising the steps of:

generating acoustic waves for travel to a receiver in a borehole at a preselected distance from a transmitter and forming measurable energies for the early and late arrivals, the frequencies of the generated waves being selected to preferentially enhance, relative to early arrivals, those late arrivals whose wave lengths are substantially larger than the diameter of a borehole;

producing waveforms from the receiver wherein the waveforms include frequency-separable early arrivals and late arrivals wherein the late arrivals have wavelengths substantially larger than the diameter of the borehole.

2. The method of claim 1 and further comprising the step of extracting the late arrival from a preselected frequency segment of the waveforms.

3. The method of claim 2 and further comprising the step of extracting the Stoneley wave from a preselected frequency segment of the waveforms.

4. A method for generating late arrivals in a waveform representative of a sonic investigation of a borehole comprising the steps of generating highly damped acoustic pulses in a borehole wherein the pulses have frequency spectra selected to preferentially excite the generation of low frequency relatively low velocity Stoneley waves including wavelengths which substantially exceed the diameter of the borehole;

producing waveforms including extractable Stoneley wave frequencies which have wavelengths substantially in excess of the diameter of the borehole after the Stoneley wave has traveled along the borehole from a transmitter to a receiver.

5. A system for generating late arrivals in waveforms representative of a sonic investigation of a borehole comprising means for generating acoustic pulses in the borehole wherein the pulses have frequency spectra selected to preferentially excite low frequency, relative low velocity, acoustic waves in the borehole; and means responsive to acoustic waves generated by the acoustic pulses to produce waveforms which include late arrival frequencies whose wavelengths substantially exceed the diameter of the borehole;

means for extracting said late arrivals from the waveforms; and means for producing a signal representative of a predetermined characteristic of said late arrival.

6. A system for generating late arrivals in waveforms representative of a sonic investigation of a borehole comprising means for generating acoustic pulses in the borehole wherein the pulses have frequency spectra over a bandwidth selected to preferentially stimulate Stoneley waves at low frequencies and traveling at low velocities along the borehole wall;

wide bandwidth receiving means operative substantially below acoustic resonance and responsive to incident acoustic waves generated by the acoustic pulses for generating waveforms with extractable Stoneley wave frequencies including wavelengths which substantially exceed the diameter of the borehole;

means for extracting said Stoneley waves from the waveforms; and means for generating a signal representative of the amplitude of the Stoneley waves.

7. A method for extracting a late arrival wave from a waveform derived from an acoustic investigation of a borehole comprising the steps of producing a waveform having a preferentially enhanced late arrival;

aligning late arrival waves in waveforms derived from a common acoustic investigation;

combining the aligned late arrival waves to derive a preferentially enhanced late arrival; and extracting the late arrival from a preselected frequency segment of the waveform.

8. The method for extracting a late arrival wave from a waveform as claimed in claim 7 wherein the producing step further includes the step of generating an acoustic pulse in the borehole to produce an acoustic wavetrain, wherein the acoustic pulse has a frequency spectrum selected to preferentially excite the late arrival in the wavetrain.

9. The method for extracting a late arrival wave as claimed in claim 8 wherein the extracting step further includes measuring the energy in the selected frequency spectrum and deriving an amplitude signal indicative thereof.

10. A method for extracting a late wave arrival from a waveform derived from an acoustic investigation of a borehole comprising the steps of producing a waveform representative of acoustic waves excited in a borehole by a sonic pulse which preferentially excites late wave arrivals of sufficient amplitude for detection;

extracting a late wave arrival from a preselected frequency segment of the waveform; and measuring the energy in the selected frequency segment and deriving an amplitude signal indicative thereof.

11. A method for extracting a late arrival from a waveform derived from an acoustic investigation of a borehole comprising the steps of producing a waveform representative of acoustic waves excited in a borehole by a sonic pulse which preferentially excites late wave arrivals of sufficient amplitude for detection while containing a wavelength which is substantially greater than the diameter of the borehole;

selecting a waveform time segment which contains the late arrival; and extracting a late wave arrival from a preselected frequency segment of the waveform.

12. The method for extracting a late arrival as claimed in claim 11 wherein the time segment selecting step further includes determining the earliest part of interest in in the waveform;

determining a place in the waveform with reference to the determined earliest part of interest to identify the waveform location where the late arrival occurs; and wherein the place determining step further includes identifying the direct arrival location in the waveform as the place from where the waveform time degment is selected.

13. The method for extracting a late arrival as claimed in claim 11 wherein the extracting step further includes measuring the amount of energy of the waveform in the preselected frequency spectrum and forming an amplitude signal representative of the measured energy.

14. A method for extracting the Stoneley wave from a waveform derived from an acoustic investigation of a borehole comprising the steps of producing a waveform having a preferentially enhanced Stoneley wave having wavelengths greater than the diameter of the borehole;

extracting the Stoneley wave from a preselected frequency band of the waveform; and measuring the energy in the selected frequency band of the waveform to obtain an indication of the amplitude of the Stoneley wave.

15. A method for extracting the Stoneley wave from waveforms derived from an acoustic investigation of a borehole with a plurality of spaced acoustic receivers comprising the steps of producing from said receivers waveforms having Stoneley waves whose wavelengths are greater than the diameter of the borehole;

aligning Stoneley segments of waveforms derived from said plurality of spaced receivers;

combining the aligned Stoneley segments to derive a waveform with a preferentially enhanced Stoneley wave; and extracting the Stoneley wave from a preselected frequency segment of said derived waveform.

16. An apparatus for extracting a late arrival wave from a waveform derived from an acoustic investigation of a borehole comprising means for producing a waveform having a preferentially enhanced late arrival; and frequency selective means operative in the frequency spectrum of the preferentially enhanced late arrival for extracting the late arrival from the produced waveform.

17. The apparatus for extracting the late arrival wave as claimed in claim 16 wherein the frequency selective means further includes energy detecting means for producing an amplitude signal indicative of the amount of energy in the extracted late arrival.

18. The apparatus for extracting the late arrival wave as claimed in claim 17 and further including means for time selecting a segment in the waveform to obtain the late arrival segment of the waveform and exclude early wave arrivals.

19. An apparatus for extracting the Stoneley wave from a waveform derived from an acoustic investigation of a borehole comprising means for producing a waveform having a preferentially enhanced Stoneley wave;

frequency selective means operative in the frequency spectrum of the preferentially enhanced Stoneley wave for extracting the Stoneley wave; and energy detecting means for producing an amplitude signal indicative of the amount of energy in the extracted Stoneley wave.

20. An apparatus for extracting the Stoneley wave from waveforms generated in an acoustic investigation of a borehole with a sonic pulse producing transmitter and a sonic receiver which is selectively spaced from the transmitter to generate said waveforms comprising transmitter means for generating acoustic pulses in the borehole wherein the pulses have frequency spectra over a bandwidth selected to preferentially stimulate Stoneley waves at low frequencies and traveling at low velocities along the borehole wall in comparison with early arrivals produced by the sonic pulses;

wide bandwidth receiving means responsive to incident acoustic waves generated by the acoustic pulses for generating waveforms including extractable Stoneley wave frequencies which include wavelengths in excess of the diameter of the borehole; and frequency selective means operative in the frequency spectrum of the preferentially stimulated Stoneley wave for extracting the Stoneley wave.

21. The apparatus for extracting the Stoneley wave as claimed in claim 20 wherein the frequency selective means further includes means responsive to the extracted Stoneley wave to produce an amplitude signal representative of the energy of the extracted Stoneley wave in the spectrum of the frequency selective means.

22. The apparatus for extracting the Stoneley wave as claimed in claim 21 wherein the transmitter means produces pulses whose frequency spectra extends down to low frequencies of the order of about five hundred herz.

23. The apparatus for extracting the Stoneley wave as claimed in claim 22 and further including a time gate located and selected to inhibit waveform segments which represent early arrivals from being passed through the frequency selective means.

24. A method for generating a display of sonic waveforms generated in an acoustic investigation of a borehole comprising the steps of producing a sonic waveform having a preferentially enhanced late arrival;

extracting the late arrival;

measuring the amplitude of the extracted late arrival; and recording the amplitude of the extracted late arrival as a function of depth to form said display.

25. The method for generating a display as claimed in claim 24 wherein the late arrival is the Stoneley wave to form a display of the extracted Stoneley wave.

26. A method for generating a display of sonic waveforms generated in an acoustic investigation of a borehole comprising the steps of producing a sonic waveform having a preferentially enhanced late arrival whose wavelength substantially exceeds the diameter of the borehole;

extracting the late arrival for a preselected low frequency segment of the waveform; and recording the extracted late arrival as a function of depth to form said display.

27. The method for generating the display as claimed in claim 26 wherein the extracting step further includes the step of measuring the energy in the frequency segment to obtain an amplitude indication of the late arrival; and wherein the recording step includes the step of recording the amplitude of the late arrival.

28. A method for generating a display of sonic waveforms generated in an acoustic investigation of a borehole comprising the steps of generating acoustic pulses having frequencies selected to preferentially excite late arrival waves in the borehole;

detecting acoustic waves excited by the acoustic pulses;

producing waveforms which include late arrivals at frequencies whose wavelengths exceed the diameter of the borehole;

extracting the late arrivals from a preselected low frequency segment of the waveform;

deriving an amplitude signal representative of the amplitude of the extracted late arrival; and recording the amplitude signal as a function of depth.

29. An apparatus for producing a display of sonic waveforms generated in an acoustic investigation of a borehole comprising means for producing a variable density log as a function of depth of waveforms including a preferentially enhanced late arriving wave generated in a low sonic frequency investigation of the borehole;

means for determining a predetermined characteristic of the late arrival as a function of depth; and means for recording the predetermined late arrival characteristic in general depth synchronization with the variable density log.

30. The apparatus for producing a display as claimed in claim 29 wherein the means for determining a predetermined characteristic of the late arrival further includes means for selecting a frequency segment of the late arrival; and means for determining the energy in the frequency segment to derive an amplitude signal indicative thereof and representative of the characteristic of the late arrival.

31. An acoustic well logging method for determining the shear modulus of the formation around a borehole comprising the steps of producing a waveform representative of an acoustic investigation of the borehole;

selecting a waveform segment which includes a late arrival;

determining a relationship between amplitudes of the late arrival as a function of the shear modulus of the formation around the borehole;

measuring the energy in the selected late arrival waveform segment as characteristic of the amplitude of the late arrival; and correcting the energy measurement in accordance with the determined relationship between amplitudes of the late arrival as a function of shear modulus to derive a measurement representative of the shear modulus of the formation.

32. An acoustic well logging method for determining the shear modulus of the formation around a borehole comprisng the steps of producing a waveform representative of an acoustic investigation of the borehole;

extracting a preselected frequency segment from the waveform as characteristic of a late arrival in the waveform;

measuring the energy in the extracted late arrival frequency segment;

generating a function signal representative of the variation of the shear modulus of the formation as a function of the energy in the extracted frequency segment of the late arrival; and correcting the measured energy in the extracted frequency segment of the late arrival with the function signal to determine the shear modulus of the formation around the borehole.

33. The acoustic well logging method for determining the shear modulus of the formation as claimed in claim 32 wherein the function signal being generated represents the variation of the shear modulus of the formation relative to the compressional modulus of the fluid in the borehole and as a function of the energy in the extracted frequency segment relative to the energy at a predetermined depth.

34. An apparatus for determining the shear modulus of the formation around a borehole in an acoustic borehole investigation comprising means for producing a waveform representative of an acoustic investigation of the borehole;

means for measuring the energy in a preselected waveform segment including a late arrival of the waveform as characteristic of the amplitude of the late arrival;

means for producing a function signal representative of the variation of the shear modulus as a function of the amplitude of the late arrival in the preselected waveform segment; and means responsive to the function signal for correcting the measured energy in the preselected waveform segment and produce an indication of the shear modulus of the formation.

35. The apparatus for determining the shear modulus of the formation as claimed in claim 34 wherein the correcting means still further includes means for producing a caliper signal indicative of the diameter of the borehole; and means for correcting the function signal with the caliper signal.

36. The apparatus for determining the shear modulus of the formation as claimed in claim 34 wherein the energy measuring means determines the energy in a preselected frequency segment of the waveform, and further including means for producing a frequency signal representative of the center frequency of the preselected frequency segment; and means for correcting the function signal with the frequency signal.

37. An acoustic well logging method for determining the shear modulus of the formation around a borehole comprising the steps of producing a waveform representative of acoustic waves excited in a borehole by a sonic pulse having a frequency spectrum selected to preferentially excite late arrivals;

extracting a late wave arrival from a preselected frequency segment of the waveform;

determining the energy in the extracted late arrival; and correcting the energy determination in accordance with a predetermined relationship between the energy in the extracted late arrival and the shear modulus to derive a measurement of the shear modulus of the formation.

38. An acoustic well logging method for determining the shear modulus of the formation around a borehole comprising the steps of generating acoustic pulses in the borehole to produce acoustic waves wherein the frequency spectrum of the pulses is selected to preferentially excite Stoneley waves having wavelengths in excess of the diameter of the borehole;

receiving the acoustic waves over a bandwidth selected to include the frequency spectrum of the Stoneley waves to produce waveforms indicative thereof;

extracting the Stoneley waves from a preselected frequency band in the Stoneley wave spectrum;

determining the energy in the extracted Stoneley wave; and correcting the energy determination to derive a measurement of the shear modulus of the formation.

39. The acoustic well logging method as claimed in claim 38 wherein the correcting step further includes forming a function signal whose amplitude represents the energy in the extracted Stoneley waves and where the amplitude of the function signal varies as a function of the shear modulus of the formation for the preselected frequency band and a predetermined diameter of the borehole; and correcting the energy determination with the function signal.

40. The acoustic well logging method as claimed in claim 39 and further including the step of
selecting a time segment from the produced waveforms to exclude early wave arrivals.

41. A method for determining inelastic parameters of a formation surrounding a borehole from an acoustic investigation of the borehole comprising the steps of
producing a waveform having a preferentially enhanced late arrival;
extracting the late arrival from a preselected frequency segment of the waveform;
determining the amount of energy in a frequency band of the extracted late arrival;
forming a first measurement of an elastic parameter of the formation from the determined energy in the late arrival;
forming a second independent measurement of the elastic parameter of the formation; and
comparing the first and second measurements of the elastic parameter to obtain an indication of the inelastic parameter.

42. A method for obtaining an indication of an elastic parameter of the formation surrounding a borehole from an acoustic investigation of a borehole comprising the steps of
producing a waveform representative of the acoustic investigation and including a late arrival;
determining the amount of energy in first and second separate frequency bands of the late arrival and forming an energy ratio between the determined energies in the first and second frequency bands as an indication of the elastic parameter.

43. A method for generating late arrivals in a waveform representative of a sonic investigation of a borehole comprising the steps of
preferentially exciting low frequency late arrival acoustic waves in a borehole for travel towards a receiver located in the borehole;
producing a waveform from the receiver wherein the waveform includes late arrivals at frequencies whose wavelengths substantially exceed the diameter of the borehole; and
generating a highly damped acoustic pulse with a duration selected to substantially place the energy of the pulse in about one and a half cycles with a pulse frequency spectrum extending towards low frequencies of the order of about five hundred herz.

44. The method for generating significant late arrivals as claimed in claim 43 wherein the duration of the transmitter pulse is essentially of the order of about one hundred and fifty microseconds.

45. The method for generating significant late arrivals as claimed in claim 44 wherein the waveform producing step further includes the step of
producing said waveform with a receiver whose frequency response is generally flat over the frequency spectrum of the acoustic pulse and extends to low frequencies where late arrival waves have wavelengths substantially greater than the diameter of the borehole.

* * * * *